US011051029B2

(12) United States Patent
Jhu et al.

(10) Patent No.: US 11,051,029 B2
(45) Date of Patent: Jun. 29, 2021

(54) DEVICE AND METHOD FOR CODING VIDEO DATA

(71) Applicant: FG Innovation Company Limited, Tuen Mun (HK)

(72) Inventors: Hong-Jheng Jhu, Hsinchu (TW); Yao-Jen Chang, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/672,991

(22) Filed: Nov. 4, 2019

(65) Prior Publication Data

US 2020/0145672 A1    May 7, 2020

Related U.S. Application Data

(60) Provisional application No. 62/755,645, filed on Nov. 5, 2018.

(51) Int. Cl.
*H04N 19/176* (2014.01)
*H04N 19/159* (2014.01)
*H04N 19/124* (2014.01)
*H04N 19/172* (2014.01)

(52) U.S. Cl.
CPC ........ *H04N 19/176* (2014.11); *H04N 19/124* (2014.11); *H04N 19/159* (2014.11); *H04N 19/172* (2014.11)

(58) Field of Classification Search
CPC ............................ H04N 19/00; H04N 19/105
See application file for complete search history.

(56) References Cited

U.S. PATENT DOCUMENTS

| | | | |
|---|---|---|---|
| 2016/0073107 A1* | 3/2016 | Moon | H04N 19/593 375/240.12 |
| 2020/0014924 A1* | 1/2020 | Zhao | H04N 19/46 |
| 2020/0296417 A1* | 9/2020 | Ko | H04N 19/176 |

* cited by examiner

*Primary Examiner* — Brian T Pendleton
*Assistant Examiner* — Kyle M Lotfi
(74) *Attorney, Agent, or Firm* — ScienBiziP, P.C.

(57) ABSTRACT

A method of decoding a bitstream by an electronic device is provided. An image frame is received from the bitstream, and a block unit is determined from the image frame. A prediction index of the block unit is determined from the bitstream. A plurality of reference mode indices is determined based on a plurality of neighboring blocks of the block unit. The electronic device determines whether the reference mode indices are greater than a specific one of a plurality of non-angular mode indices. When the reference mode indices are greater than the specific non-angular mode index, the electronic device determines whether a difference between the reference mode indices is equal to two. When the difference is equal to two, a prediction mode is selected according to the prediction index and based on a first candidate list. Then, the block unit is reconstructed based on the prediction mode.

16 Claims, 9 Drawing Sheets

DEVICE AND METHOD FOR CODING VIDEO DATA

CROSS-REFERENCE TO RELATED APPLICATION(S)

The present application claims the benefit of and priority to a provisional U.S. Patent Application Ser. No. 62/755,645, filed on Nov. 5, 2018, entitled "Most Probable Modes for Multi-Reference Lines". The disclosure of the US75336 application is hereby incorporated fully by reference into the present application.

FIELD

The present disclosure generally relates to video coding, and more particularly, to techniques for predicting a block unit in an image frame based on different candidate lists.

BACKGROUND

Intra prediction is a coding tool for video coding. In a conventional video coding method, an encoder and a decoder only use previously reconstructed pixels in a closest pixel line adjacent to a coding block to generate reference pixels and predictors for predicting or reconstructing the coding block along an orientation. However, the orientation is selected from a plurality of intra modes included in a predefined mode list. In addition, the number of intra modes may be too high for the encoder to quickly select an appropriate prediction mode when the encoder predicts the coding block based on the prediction mode (which is included in the predefined mode list). Thus, the encoder needs to determine a frequent mode list that adapts to different coding blocks. When the encoder determines the frequent mode list that adapts to different coding blocks, the decoder also needs to determine the frequent mode list that adapts to different coding blocks in the same way.

The frequent mode list may include non-angular intra modes, two previous intra modes of two neighboring blocks of the coding block, and two derived intra modes adjacent to the two previous intra modes. However, one of the two derived intra modes adjacent to a specific one of the two neighboring intra modes may be identical to the other one of the two neighboring intra modes when the two neighboring intra modes are adjacent to each other. Thus, the frequent mode list determined for two adjacent neighboring intra modes may be different from the frequent mode list determined for two separated neighboring intra modes. In addition, the frequent mode list for the two separated neighboring intra modes may be identical, even if a distance between the two separated neighboring intra modes may be different.

SUMMARY

The present disclosure is directed to a device and method for reconstructing a block unit in an image frame based on a plurality of candidate modes in a plurality of candidate lists.

In a first aspect of the present application, a method for decoding a bitstream by an electronic device is provided. The method comprises receiving an image frame of the bitstream and determining a block unit from the image frame; determining a prediction index of the block unit from the bitstream; determining a plurality of reference mode indices based on a plurality of previous mode indices of a plurality of neighboring blocks of the block unit; determining whether each of the plurality of reference mode indices is greater than a specific one of a plurality of non-angular mode indices; determining whether a difference between the plurality of reference mode indices is equal to two when each of the plurality of reference mode indices is greater than the specific one of the plurality of non-angular mode indices; selecting, based on the prediction index, a prediction mode from a first candidate list when the difference between the plurality of reference mode indices is equal to two; and reconstructing the block unit based on the prediction mode.

In a second aspect of the present application, a method for decoding a bitstream by an electronic device is provided. The method comprises receiving an image frame of the bitstream to determine a block unit from the image frame; determining a plurality of reference mode indices based on a plurality of previous mode indices of a plurality of neighboring blocks of the block unit; comparing the plurality of reference mode indices to each other; selecting a prediction list from a plurality of candidate lists based on the comparison of the plurality of reference mode indices; selecting, based on the prediction index, a prediction mode from the prediction list; and reconstructing the block unit based on the prediction mode. In the method, a first one of the plurality of candidate lists is selected when a difference between the plurality of reference mode indices is equal to two, and a second one of the plurality of candidate lists difference from the first one of the plurality of candidate lists is selected when the difference is greater than two.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
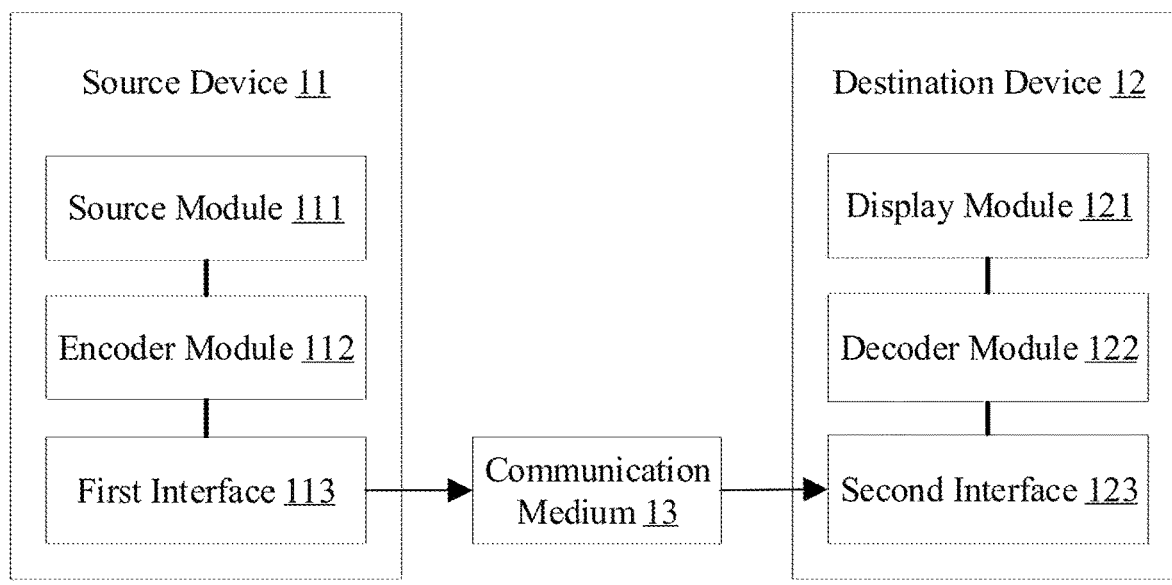
FIG. 1 is a block diagram of an example system configured to encode and decode video data, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any coding function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processors (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 is a block diagram of an example system that may be configured to encode and decode video data according to an example implementation of the present application. In the implementation, the system includes a source device 11, a destination device 12, and a communication medium 13. In at least one implementation, the source device 11 may include any device configured to encode video data and transmit encoded video data to the communication medium 13. In at least one implementation, the destination device 12 may include any device configured to receive encoded video data via the communication medium 13 and to decode encoded video data.

In at least one implementation, the source device 11 may wiredly and/or wirelessly communicate with the destination device 12 via the communication medium 13. The source device 11 may include a source module 111, an encoder module 112, and a first interface 113. The destination device 12 may include a display module 121, a decoder module 122, and a second interface 123. In at least one implementation, the source device 11 may be a video encoder, and the destination device 12 may be a video decoder.

In at least one implementation, the source device 11 and/or the destination device 12 may be a mobile phone, a tablet, a desktop, a notebook, or other electronic devices. FIG. 1 merely illustrates one example of the source device 11 and the destination device 12, and the source device 11 and the destination device 12 in other implementations may include more or less components than illustrated or have a different configuration of the various components.

In at least one implementation, the source module 111 of the source device 11 may include a video capture device to capture a new video, a video archive storing previously captured video, and/or a video feed interface to receive video from a video content provider. In at least one implementation, the source module 111 of the source device 11 may generate computer graphics-based data as the source video, or a combination of live video, archived video, and computer-generated video. In at least one implementation, the video capturing device may be a charge-coupled device (CCD) image sensor, a complementary metal-oxide-semiconductor (CMOS) image sensor, or a camera.

In at least one implementation, the encoder module 112 and the decoder module 122 may each be implemented as any of a variety of suitable encoder/decoder circuitry, such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of the present disclosure. In at least one implementation, each of the encoder module 112 and the decoder module 122 may be included in one or more encoders or decoders, any of which may be integrated as part of a combined encoder/decoder (CODEC) in a respective device.

In at least one implementation, the first interface 113 and the second interface 123 may adopt customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In at least one implementation, the first interface 113 and the second interface 123 may each include any device configured to transmit and/or store a compliant video bitstream to the communication medium 13 and to receive the compliant video bitstream from the communication medium 13. In at least one implementation, the first interface 113 and the second interface 123 may include a computer system interface that may enable a compliant video bitstream to be stored on a storage device or to be received from the storage device. For example, the first interface 113 and the second interface 123 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

In at least one implementation, the display module 121 may include a display using liquid crystal display (LCD) technology, a plasma display technology, an organic light emitting diode (OLED) display technology, or light emitting polymer display (LPD) technology, although other display technologies may be used in other implementations. In at least one implementation, the display module 121 may include a high definition display or an ultra high definition display.

Figure 2:
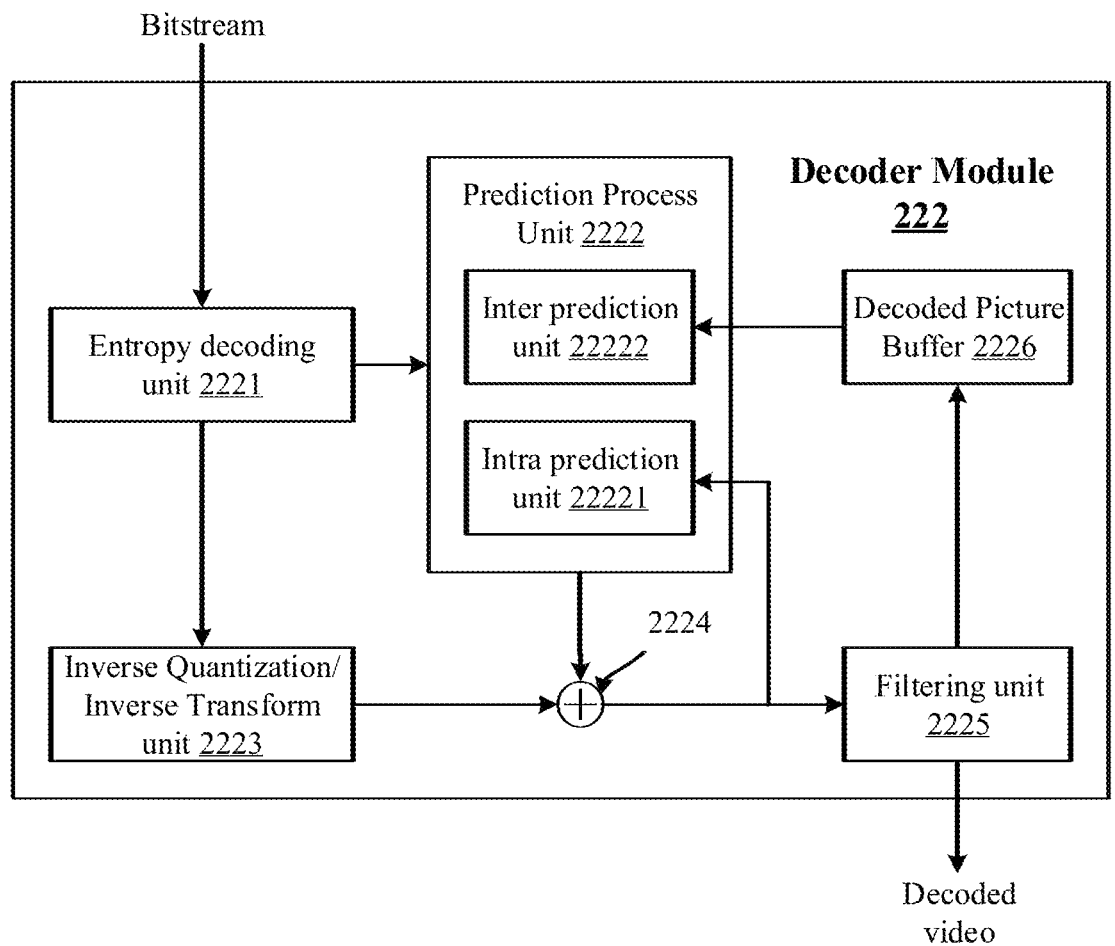
FIG. 2 is a block diagram of an example decoder module of the destination device in the system of FIG. 1, according to an example implementation of the present application.

FIG. 2 is a block diagram of a decoder module 222 representing an example implementation of the decoder module 122 of the destination device 12 in the system of FIG. 1, according to an example implementation of the present application. In at least one implementation, the decoder module 222 includes an entropy decoder (e.g., an entropy decoding unit 2221), a prediction processor (e.g., a prediction process unit 2222), an inverse quantization/inverse transform processor (e.g., an inverse quantization/inverse transform unit 2223), a summer (e.g., a first summer 2224), a filter (e.g., a filtering unit 2225), and a decoded picture buffer (e.g., a decoded picture buffer 2226). In at least one implementation, the prediction process unit 2222 of the decoder module 222 further includes an intra prediction processor (e.g., an intra prediction unit 22221) and an inter prediction processor (e.g., an inter prediction unit 22222). In at least one implementation, the decoder module 222 receives a bitstream, and decodes the bitstream to output a decoded video.

In at least one implementation, the entropy decoding unit 2221 may receive the bitstream including a plurality of syntax elements from the second interface 123 in FIG. 1 and perform a parsing operation on the bitstream to extract syntax elements from the bitstream. As part of performing the parsing operation, the entropy decoding unit 2221 may entropy decode the bitstream to generate quantized transform coefficients, quantization parameters, transform data, motion vectors, intra modes, partition information, and other syntax information. In at least one implementation, the entropy decoding unit 2221 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2221 may provide the quantized transform coefficients, the quantization parameters, and the transform data to the inverse quantization/inverse transform unit 2223, and provide the motion vectors, the intra modes, the partition information, and other syntax information to the prediction process unit 2222.

In at least one implementation, the prediction process unit 2222 may receive syntax elements, such as motion vectors, intra modes, partition information, and other syntax information, from the entropy decoding unit 2221. In at least one implementation, the prediction process unit 2222 may receive the syntax elements including the partition information, and then divide image frames according to the partition information. In at least one implementation, each of the image frames may be divided into at least one image block according to the partition information. The at least one image block may include a luminance block for reconstructing a plurality of luminance samples, and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction process unit 2222 receives predicted data including the intra mode or the motion vector for a current image block of a specific one of the image frames. The current image block may be one of the luminance block and the at least one of the chrominance block in the specific image frame.

In at least one implementation, the intra prediction unit 22221 may perform intra-predictive coding of a current block unit relative to one or more neighboring blocks in the same frame as the current block unit based on the syntax elements related to the intra mode to generate a predicted block. In at least one implementation, the intra mode may specify the location of reference samples selected from the neighboring blocks within the current frame.

In at least one implementation, the intra prediction unit 22221 may reconstruct a plurality of chroma components of the current block unit based on the plurality of luma components of the current block unit when the luma components of the current block are reconstructed by the prediction process unit 2222.

In at least one implementation, the inter prediction unit 22222 may perform inter-predictive coding of the current block unit relative to one or more blocks in one or more reference image blocks based on the syntax elements related to the motion vector to generate the predicted block. In at least one implementation, the motion vector may indicate a displacement of the current block unit within the current image block relative to a reference block unit within the reference image block. The reference block unit is a block that is determined to closely match the current block unit. In at least one implementation, the inter prediction unit 22222 receives the reference image block stored in the decoded picture buffer 2226 and reconstructs the current block unit based on the received reference image blocks.

In at least one implementation, the inverse quantization/inverse transform unit 2223 may apply inverse quantization and inverse transformation to reconstruct the residual block in the pixel domain. In at least one implementation, the inverse quantization/inverse transform unit 2223 may apply inverse quantization to the residual quantized transform coefficient to generate a residual transform coefficient, and then apply inverse transformation to the residual transform coefficient to generate the residual block in the pixel domain.

In at least one implementation, the inverse transformation may be inversely applied by the transformation process, such as discrete cosine transform (DCT), discrete sine transform (DST), adaptive multiple transform (AMT), mode-dependent non-separable secondary transform (MDNSST), hypercube-givens transform (HyGT), signal dependent transform, Karhunen-Loéve transform (KLT), wavelet transform, integer transform, sub-band transform or a conceptually similar transform. In at least one implementation, the inverse transformation may convert the residual information from a transform domain, such as a frequency domain, back to the pixel domain. In at least one implementation, the degree of inverse quantization may be modified by adjusting a quantization parameter.

In at least one implementation, the first summer 2224 adds the reconstructed residual block to the predicted block provided from the prediction process unit 2222 to produce a reconstructed block.

In at least one implementation, the filtering unit 2225 may include a deblocking filter, a sample adaptive offset (SAO) filter, a bilateral filter, and/or an adaptive loop filter (ALF) to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the first summer 2224. In at least one implementation, the filtering unit 2225 may output the decoded video to the display module 121 or other video receiving unit after the filtering unit 2225 performs the filtering process for the reconstructed blocks of the specific image frame.

In at least one implementation, the decoded picture buffer 2226 may be a reference picture memory that stores the reference block for use in decoding the bitstream by the prediction process unit 2222, e.g., in inter-coding modes. The decoded picture buffer 2226 may be formed by any of a variety of memory devices, such as dynamic random access memory (DRAM), including synchronous DRAM (SDRAM), magneto-resistive RAM (MRAM), resistive RAM (RRAM), or other types of memory devices. In at least one implementation, the decoded picture buffer 2226 may be on-chip with other components of the decoder module 222, or off-chip relative to those components.

Figure 3:
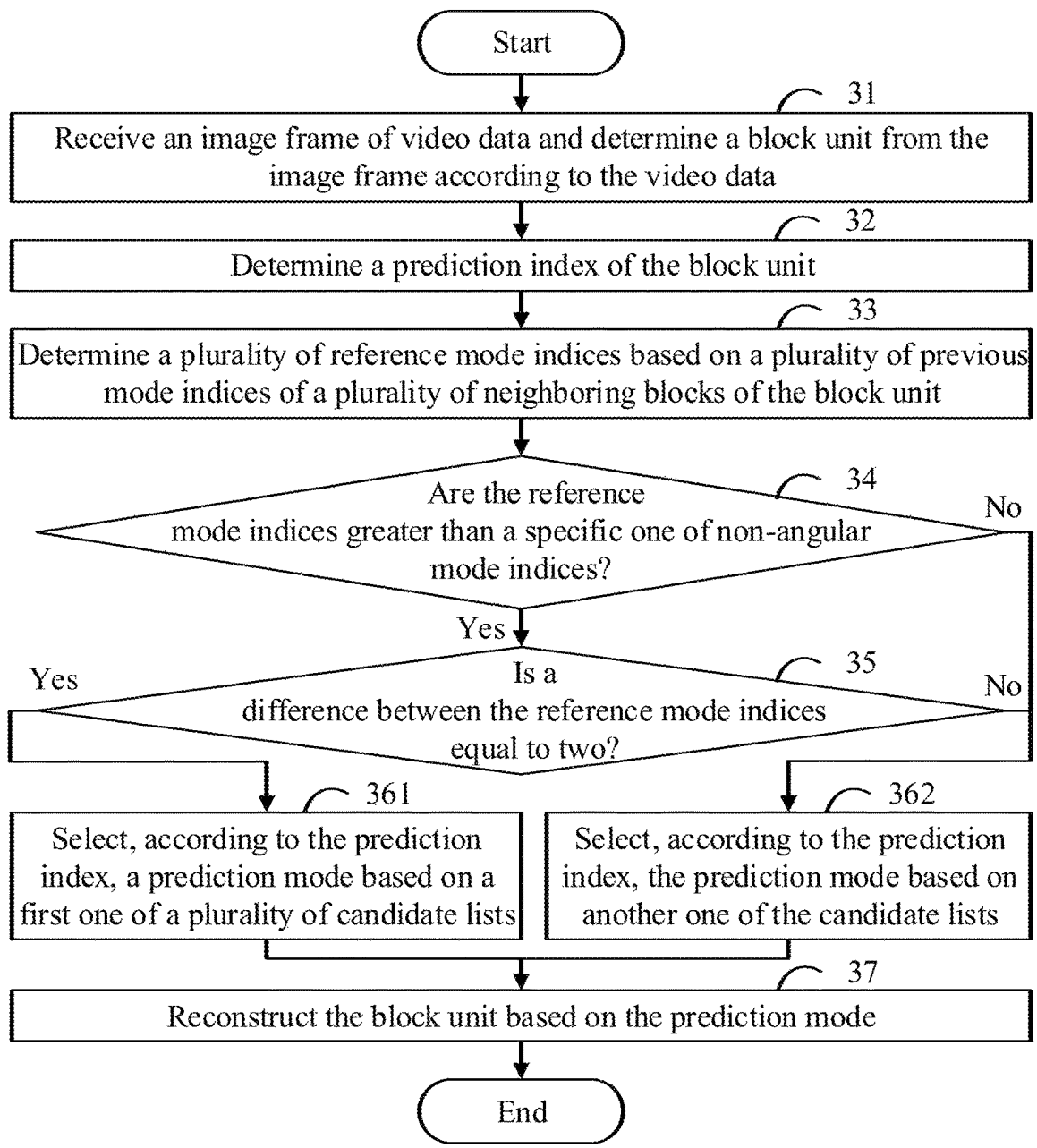
FIG. 3 illustrates a flowchart of an example reconstruction method for reconstructing a block unit by selecting a prediction mode based on a plurality of candidate lists, according to an example implementation of the present application.

FIG. 3 illustrates a flowchart of an example reconstruction method for reconstructing a block unit by selecting a prediction mode based on a plurality of candidate lists, according to an example implementation of the present application. The example method is provided by way of example only, as there are a variety of ways to carry out the method. The method described in FIG. 3 may be carried out using the configurations illustrated in FIG. 1 and FIG. 2, for example, and various elements of these figures are referenced in explaining the example method. Each block shown in FIG. 3 may represent one or more processes, methods, or sub-routines, carried out in the example method. Furthermore, the order of blocks is illustrative only and may change. Additional blocks may be added or less blocks may be utilized without departing from the present disclosure.

At block 31, a decoder module may receive an image frame of video data and determine a block unit from the image frame according to the video data.

In at least one implementation, the video data may be a bitstream. In at least one implementation, with reference to FIG. 1 and FIG. 2, the destination device 12 may receive the bitstream from an encoder, such as the source device 11, via the second interface 123 of the destination device 12. The second interface 123 may provide the bitstream to the decoder module 222. The decoder module 222 may determine the image frame based on the bitstream, and divide the image frame to determine the block unit according to a plurality of partition indications in the bitstream. For example, the decoder module 222 may divide the image frames to generate a plurality of coding tree units, and may further divide one of the coding tree units to determine the block unit according to the partition indications (e.g., based on a video coding standard).

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 32, the decoder module may determine a prediction index of the block unit.

In at least one implementation, with reference to FIG. 2, the decoder module 222 may select a prediction mode from a plurality of intra candidate modes of an intra mode list based on the prediction index when the block unit is predicted in an intra prediction. In at least one implementation, the prediction index may be included in the prediction indications for the block unit. In at least one implementation, the intra candidate modes have a plurality of intra mode indices that each indicates one of the intra candidate modes.

In at least one implementation, the intra candidate modes may be categorized into a plurality of prediction lists, and the prediction indications may further include a list flag indicating that the prediction mode may be included in a specific one of the prediction lists. In at least one implementation, the number of the prediction lists may be equal to two. Thus, the prediction mode may be included in the specific prediction list when the list flag is equal to one. In addition, the prediction mode may be included in the other of the two prediction lists when the list flag is equal to zero. In at least one implementation, the number of the intra candidate modes in the specific prediction list may be different from the number of the intra candidate modes in the other of the two prediction lists. In at least one implementation, the number of the intra candidate modes in the specific prediction list may be less than the number of the intra candidate modes in the other of the two prediction lists. Thus, the prediction index for the prediction mode included in the specific prediction list may be different from the prediction index for the prediction mode included in the other of the two prediction lists. For example, the prediction index may be an intra luma mpm index for selecting the prediction mode from the specific prediction list, while the prediction index may be an intra luma mpm remainder for selecting the prediction mode from the other of the two prediction lists.

At block 33, the decoder module may determine a plurality of reference mode indices for the block unit based on a plurality of previous mode indices of a plurality of neighboring blocks of the block unit.

In at least one implementation, with reference to FIG. 2, the decoder module 222 may determine the neighboring blocks and further determine a plurality of neighboring modes of the neighboring blocks when the neighboring blocks are predicted in the intra prediction. In at least one implementation, the neighboring modes may be selected from the intra candidate modes, and therefore the previous mode indices may be selected from the intra mode indices. Then, the previous mode indices may be set as the reference modes indices for determining the prediction mode of the block unit. In at least one implementation, the number of the determined neighboring modes may be equal to two, and as such, both of the number of the previous mode indices and the number of the reference mode indices may be equal to two.

In at least one implementation, the neighboring blocks may be a plurality of sub-blocks located at a plurality of predefined neighboring locations of the block unit. In at least one implementation, each of the sub-blocks may cover at least one sample location in the image frame. In at least one implementation, the at least one sample location in a specific one of the sub-blocks may be identical to one of the predefined neighboring locations when the number of the at least one sample location in the specific sub-block is equal to one. In at least one implementation, the at least one sample location in a specific one of the sub-blocks may cover one of the predefined neighboring locations when the number of the at least one sample location in the specific sub-block is greater than one.

Figure 4:
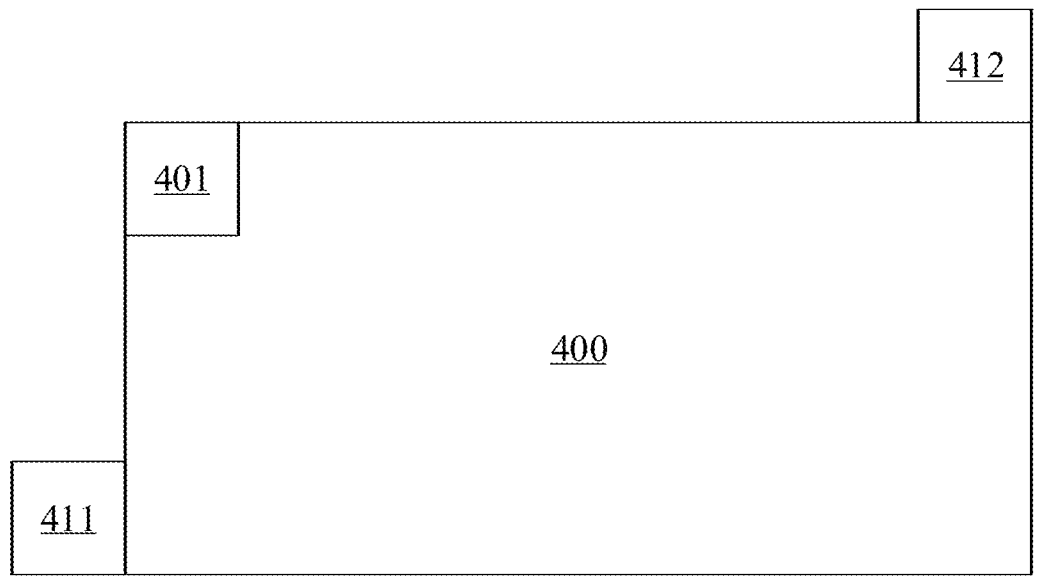
FIG. 4 is a schematic illustration of a block unit and a plurality of neighboring locations, according to example implementations of the present application.

FIG. 4 is a schematic illustration of an example implementation of the block unit 400 and the neighboring locations 411 and 412. In at least one implementation, a top-left block sample 401 in the block unit 400 relative to a top-left frame sample of the image frame may be located at a luma location (Xb, Yb), and a block size of the block unit may include a block width Wb and a block height Hb. In at least one implementation, the neighboring location 411 may be equal to (Xb−1, Yb+Hb−1), and the neighboring location 412 may be equal to (Xb+Wb−1, Yb−1). In at least one implementation, the predefined neighboring locations may be preset to be identical to or different from the neighboring locations 411 and 412. In at least one implementation, the neighboring blocks may include a first one of the neighboring blocks covering one sample location identical to the predefined neighboring location 411, and a second one of the neighboring blocks covering one sample location identical to the predefined neighboring location 412. In at least one implementation, the neighboring blocks may include the first neighboring block covering more than one sample location including the predefined neighboring location 411, and the second neighboring block covering more than one sample location including the predefined neighboring location 412.

In at least one implementation, there may be a plurality of reference blocks neighboring the block unit. In at least one implementation, the reference blocks may be predicted in the intra prediction or in an inter prediction. In at least one implementation, the previous mode indices of a specific one of the reference blocks may be set as one of the reference mode indices when the specific reference block is predicted in the intra prediction. In at least one implementation, one of a plurality of non-angular mode indices may be set as one of the reference mode indices when the specific reference block is predicted in the inter prediction.

Referring back to FIG. 3, at block 34, the decoder module may determine whether the reference mode indices are greater than a specific one of the non-angular mode indices. In at least one implementation, the procedure may proceed to block 35 when each of the reference mode indices is greater than the specific non-angular mode index. In at least one implementation, the procedure may proceed to block 362 when at least one of the reference mode indices is less than or equal to the specific non-angular mode index.

In at least one implementation, the intra candidate modes may include a plurality of non-angular candidate modes and a plurality of angular candidate modes. Thus, the intra mode indices may include the non-angular mode indices that each indicates one of the non-angular candidate modes and a plurality of angular mode indices that each indicates one of the angular candidate modes. In at least one implementation, the non-angular candidate modes may include a Planar mode and a DC mode. In at least one implementation, the non-angular mode index of the Planar mode may be equal to zero, and the non-angular mode index of the DC mode may be equal to one. In at least one implementation, each of the angular mode indices may be greater than one. In at least one implementation, with reference to FIG. 2, the decoder module 222 may determine that the reference mode indices greater than the specific non-angular mode index may be selected from the angular mode indices when the specific non-angular mode index is set as the non-angular mode index of the DC mode.

In at least one implementation, the decoder module 222 may determine the specific prediction list based on the reference mode indices when each of the reference mode indices is greater than the specific non-angular mode index. In at least one implementation, the decoder module 222 may determine the specific prediction list based on a specific one of the reference mode indices when the specific reference mode index is greater than the specific non-angular mode index and the other reference mode indices are less than or equal to the specific non-angular mode index. In at least one implementation, the decoder module 222 may determine the specific prediction list based on a predefined candidate list when each of the reference mode indices is less than or equal to the specific non-angular mode index.

At block 35, the decoder module may determine whether a difference between the reference mode indices is equal to two. In at least one implementation, the procedure may proceed to block 361 when the difference between the reference mode indices is equal to two. In at least one implementation, the procedure may proceed to block 362 when the difference between the reference mode indices is not two.

In at least one implementation, with reference to FIG. 2, the decoder module 222 may compare the reference mode indices with each other. In at least one implementation, the number of the reference mode indices may be equal to two. Thus, there may be only one difference generated from the two reference mode indices. In at least one implementation, the decoder module 222 may compare the difference between the two reference mode indices with the number 2 for determining the specific prediction list.

At block 361, the decoder module may select, according to the prediction index, the prediction mode based on a first one of a plurality of candidate lists.

In at least one implementation, the candidate lists are different from each other. In at least one implementation, with reference to FIG. 2, the decoder module 222 may select one of the candidate lists based on the reference mode indices. In at least one implementation, the decoder module 222 may select the first one of the candidate lists as the specific prediction list for determining the prediction mode of the block unit when the difference between the reference mode indices is equal to two. In at least one implementation, the first candidate list may include a plurality of first candidate modes selected from the intra candidate modes. In at least one implementation, the other unselected intra candidate modes may be added to the other prediction list when the first candidate modes in the first candidate list are selected from the intra candidate modes to add to the specific prediction list. In at least one implementation, the number of the first candidate modes may be equal to six. In at least one implementation, the first candidate modes may have a plurality of first derived indices derived based on the reference mode indices. In at least one implementation, a first one and a second one of the first derived indices may be equal to the reference mode indices. As such, the first one and the second one of the first candidate modes may be the neighboring modes. In at least one implementation, a third one of the first derived indices may be equal to a first derived value determined by adding one to a smaller one of the reference mode indices. In at least one implementation, a fourth one of the first derived indices may be equal to a second derived value determined by subtracting one from the smaller one the reference mode indices. In at least one implementation, a fifth one of the first derived indices may be equal to a third derived value determined by adding one to a larger one of the reference mode indices. In at least one implementation, one of the first candidate modes may be the Planar mode.

In at least one implementation, the first derived value determined by adding one to the smaller one of the reference mode indices may be equal to an intermediate value between the reference mode indices, since the difference between the reference mode indices may be equal to two. Thus, the second derived value, the smaller one of the reference mode indices, the first derived value, the larger one of the reference mode indices, and the third derived value may be five consecutive integers.

In at least one implementation, the number of the intra candidate modes may be equal to N. In at least one implementation, the number of the angular candidate modes may be equal to N−2 when the number of the non-angular candidate modes is equal to two. In addition, the angular mode indices may be equal to an index value selected from a first range within two to N−1 when the intra mode indices is selected from a second range within zero to N−1 and the non-angular mode indices is equal to zero or one. In at least one implantation, the second derived value may be derived by subtracting one from two when the smaller one of the reference mode indices is equal to two. Thus, the fifth one of the first candidate modes may be the DC mode when the second derived value is equal to one. However, a probability of selecting the DC mode as the prediction mode is very low when the reference mode indices are different from the non-angular mode indices. Therefore, the decoder module 222 may set the second derived value to be equal to N−1.

In at least one implementation, with reference to FIG. 2, the decoder module 222 may set the second derived value be equal to N−2 to prevent the first candidate list from including two inverse directions, since the intra candidate mode having the intra mode index 2 may have an inverse direction with the intra candidate mode having the intra mode index N−1. In at least one implantation, the third derived value may be derived by adding one to N−1 when the larger one of the reference mode indices is equal to N−1. However, there is no intra mode index equal to N. Thus, the decoder module 222 may set the third derived value to two. In at least one implementation, the decoder module 222 may set the third derived value to 3 to prevent the first candidate list from including two inverse directions.

In at least one implementation, the prediction mode may be included in the specific prediction list when the list flag is equal to one. Thus, the decoder module 222 may select the prediction mode from the first candidate list when the list flag is equal to one. In at least one implementation, the prediction mode may be included in the other of the two prediction lists when the list flag is equal to zero. Thus, the decoder module 222 may select the prediction mode from the other prediction list having the other intra candidate modes which are not included in the first candidate list when the list flag is equal to zero.

At block 362, the decoder module may select, according to the prediction index, the prediction mode based on another one of the plurality of candidate lists (e.g., any other candidate list except the first candidate list).

In at least one implementation, the selected other candidate list may be different from the first candidate list, since the candidate lists may be different from each other. In at least one implementation, the selected other candidate list may include a plurality of second candidate modes selected from the intra candidate modes. In at least one implementation, the other unselected intra candidate modes may be added to the other prediction list when the second candidate modes in the selected other candidate list is selected from the intra candidate modes to add to the specific prediction list. In at least one implementation, the number of the second candidate modes may be equal to six. In at least one implementation, the second candidate modes may have a plurality of second derived indices derived based on at least one of the reference mode indices. In at least one implementation, at least one of the second derived indices may be different from the first derived indices, since the candidate lists may be different from each other. For example, the decoder module 222 in FIG. 2 may select the second candidate modes to be added to the other prediction list when the difference between the reference mode indices is greater than two.

In at least one implementation, at least one of the non-angular mode indices may be excluded from the specific prediction list. Thus, some of the originally unselected intra candidate modes may be moved from the other prediction list to the specific prediction list, since the number of the intra candidate mode in the specific prediction is insufficient. In at least one implementation, there may be four intra candidate modes adjacent to the two reference mode indices when the difference between the two reference mode indices is greater than two. In addition, there may be two intra candidate modes adjacent to the two reference mode indices when the difference between the two reference mode indices is equal to one or zero. However, there may be three intra candidate modes adjacent to the two reference mode indices when the difference between two reference mode indices is equal to two. Thus, the first candidate list for the difference equal to two may be different from the other candidate lists for the difference greater than two or equal to one or zero, since the first candidate list needs another derived index for the specific prediction list.

In at least one implementation, the prediction mode may be included in the specific prediction list when the list flag is equal to one. Thus, the decoder module 222 in FIG. 2 may select the prediction mode from the selected other candidate list when the list flag is equal to one. In at least one implementation, the prediction mode may be included in the other of the two prediction lists when the list flag is equal to zero. Thus, the decoder module 222 may select the prediction mode from the other prediction list having the other intra candidate modes which are not included in the selected other candidate list when the list flag is equal to zero.

At block 37, the decoder module may reconstruct the block unit based on the determined prediction parameters.

In at least one implementation, with reference to FIG. 1 and FIG. 2, the inter prediction unit 22222 may generate a predicted component for one of a plurality of block components in the block unit based on the prediction mode. In at least one implementation, the first summer 2224 of the decoder module 222 in the destination device 12 may add the predicted components to a plurality of residual components determined from the bitstream to reconstruct the block unit. In addition, the decoder module 222 may reconstruct all of the other block units in the image frame for reconstructing the image frame and the video.

Figure 5:
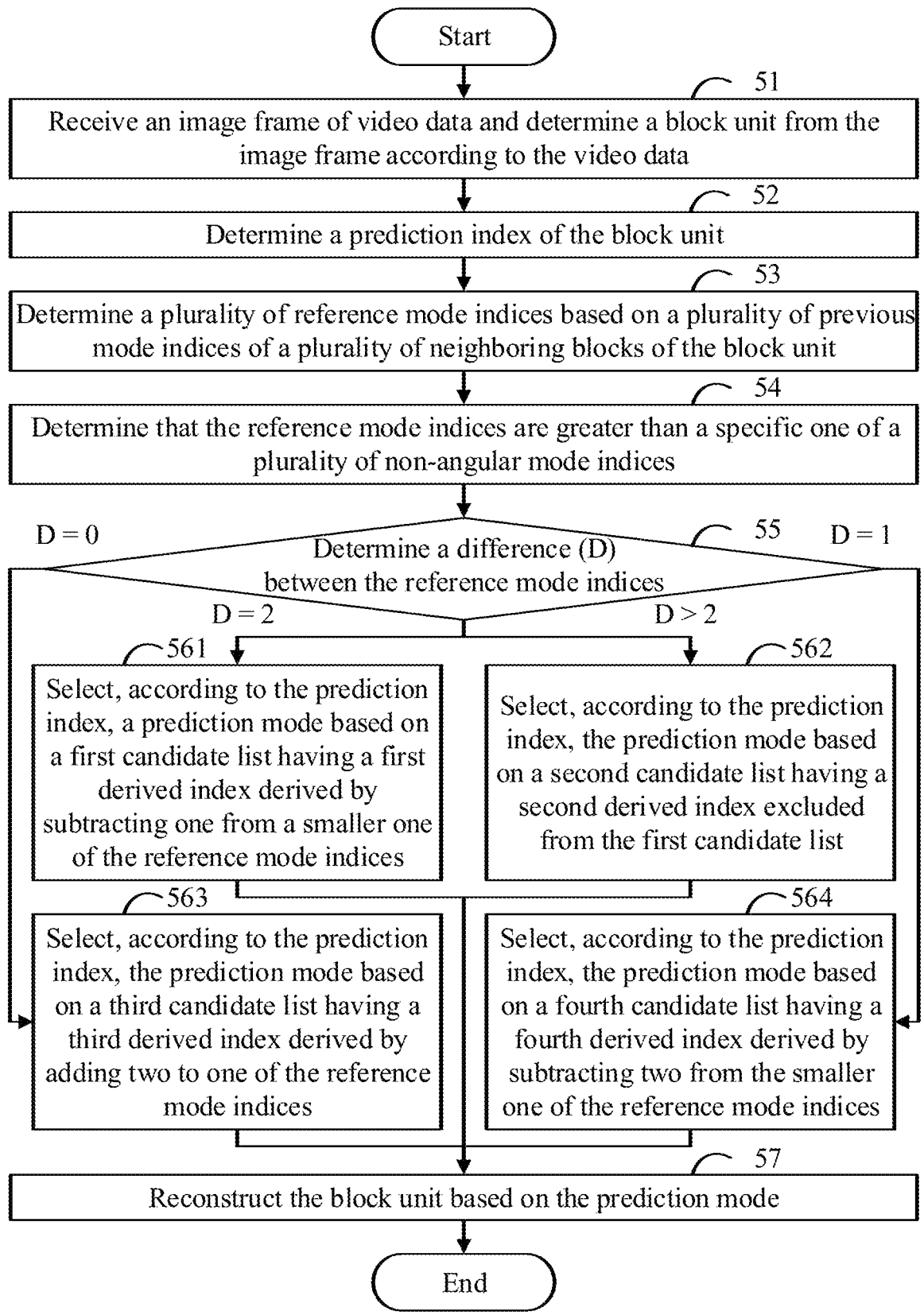
FIG. 5 illustrates a flowchart of an example reconstruction method for reconstructing a block unit by selecting a prediction mode based on a plurality of candidate lists, according to an example implementation of the present application.

FIG. 5 illustrates a flowchart of an example reconstruction method for reconstructing a block unit by selecting a prediction mode based on a plurality of candidate lists, according to an example implementation of the present application. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 5 may represent one or more processes, methods, or subroutines, carried out in the example method. Furthermore, the order of blocks is illustrative only and may change. Additional blocks may be added or less blocks may be utilized without departing from the present disclosure.

At block 51, a decoder module may receive an image frame of video data and determine a block unit from the image frame according to the video data.

In at least one implementation, the video data may be a bitstream. In at least one implementation, with reference to FIGS. 1 and 2, the destination device 12 may receive the bitstream from an encoder, such as the source device 11, via the second interface 123 of the destination device 12. The second interface 123 may provide the bitstream to the decoder module 222. The decoder module 222 may determine the image frame based on the bitstream, and divide the image frame to determine the block unit according to a plurality of partition indications in the bitstream. For example, the decoder module 222 may divide the image frames to generate a plurality of coding tree units, and further divide one of the coding tree units to determine the block unit according to the partition indications (e.g., based on a video coding standard).

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 52, the decoder module may determine a prediction index of the block unit.

In at least one implementation, with reference to FIG. 2, the decoder module 222 may select a prediction mode from a plurality of intra candidate modes of an intra mode list based on the prediction index when the block unit is predicted in an intra prediction. In at least one implementation, the prediction index may be included in the prediction indications for the block unit. In at least one implementation, the intra candidate modes have a plurality of intra mode indices that each indicates one of the intra candidate modes.

In at least one implementation, the intra candidate modes may be categorized into a plurality of prediction lists, and the prediction indications may further include a list flag indicating whether the prediction mode is included in a specific one of the prediction lists. In at least one implementation, the number of the prediction lists may be equal to two. Thus, the prediction mode may be included in the specific prediction list when the list flag is equal to one. In addition, the prediction mode may be included in the other one of the prediction lists when the list flag is equal to zero.

In at least one implementation, the number of the intra candidate modes in the specific prediction list may be different from the number of the intra candidate modes in the other of the two prediction lists.

In at least one implementation, there is a plurality of reference line candidates neighboring the block unit. In at least one implementation, each of the reference line candidates includes a plurality of candidate line samples. In at least one implementation, with reference to FIGS. 1 and 2, the encoder module 112 may select one of the reference line candidates for predicting the block unit, and may provide a reference line index indicating the selected reference line candidate to the destination device 12. In the implementation, the decoder module 222 may determine the selected reference line candidate based on the reference line index, and the intra prediction unit 22221 may determine the candidate line samples in the selected reference line candidate as a plurality of reference line samples. Thus, the decoder module 222 may reconstruct the block unit based on the reference line samples.

Figure 6:
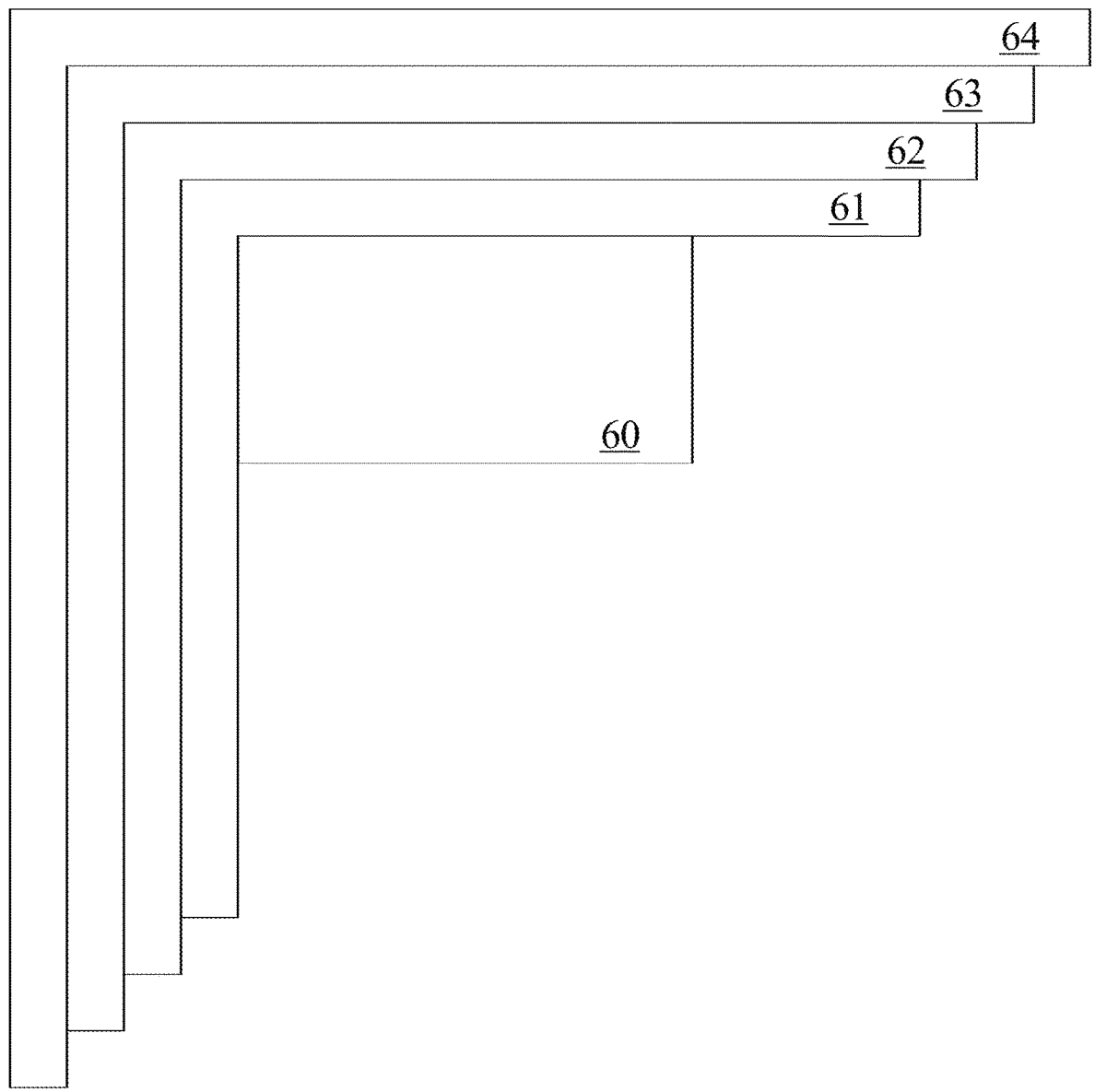
FIG. 6 is a schematic illustration of a block unit and a plurality of reference line candidates, according to example implementations of the present application.

FIG. 6 is a schematic illustration of an example implementation of a block unit 60, and reference line candidates 61, 62, 63, and 64 neighboring the block unit 60. In at least one implementation, with reference to FIG. 2, the intra prediction unit 22221 may select one of the reference line candidates 61-64 (each having the candidate line samples based on the reference line index), and may determine the reference line samples in the selected reference line candidates. In at least one implementation, the intra prediction unit 22221 may select the first reference line candidate 61 and determine the reference line samples in the first reference line candidate 61 when the reference line index is equal to a first predefined value. In at least one implementation, the intra prediction unit 22221 may select one of the reference line candidates 62-64 when the reference line index is different from the first predefined value. In at least one implementation, the reference line index may be a syntax element intra_luma_ref_idx in versatile video coding (VVC) or VVC test model (VTM). In at least one implementation, the first predefined value may be equal to zero.

In at least one implementation, the encoder module 112 in FIG. 1 may select the intra prediction mode from the prediction lists when the encoder module 112 selects the first one of the reference line candidate to predict the block unit. In at least one implementation, the encoder module 112 may select the prediction mode only from the specific prediction list when the encoder module 112 selects a specific one of the reference line candidates different from the first reference line candidate to predict the block unit. For example, the decoder module may determine the specific reference line candidate is the reference line candidate 62 based on the reference line index, select the prediction mode from the specific prediction list, and reconstruct the block unit 60 based on the prediction mode according to the candidate line samples in the reference line candidate 62.

Returning to FIG. 5, at block 53, the decoder module may determine a plurality of reference mode indices for the block unit based on a plurality of previous mode indices of a plurality of neighboring blocks of the block unit.

In at least one implementation, with reference to FIG. 2, the decoder module 222 may determine the neighboring blocks and further determine a plurality of neighboring modes of the neighboring blocks when the neighboring blocks are predicted in the intra prediction. In at least one implementation, the neighboring modes may be selected from the intra candidate modes, and therefore, the previous mode indices may be selected from the intra mode indices.

Then, the previous mode indices may be set as the reference modes indices for determining the prediction mode of the block unit. In at least one implementation, the number of the determined neighboring modes may be equal to two. As such, both of the number of the previous mode indices and the number of the reference mode indices may be equal to two.

In at least one implementation, the neighboring blocks may be a plurality of sub-blocks located at a plurality of predefined neighboring locations of the block unit. In at least one implementation, each of the sub-blocks may cover at least one sample location in the image frame. In at least one implementation, the at least one sample location in a specific one of the sub-blocks may be identical to one of the predefined neighboring locations when the number of the at least one sample location in the specific sub-block is equal to one. In at least one implementation, the at least one sample location in a specific one of the sub-blocks may cover one of the predefined neighboring locations when the number of the at least one sample location in the specific sub-block is greater than one.

In at least one implementation, there may be a plurality of reference blocks neighboring the block unit. In at least one implementation, the reference blocks may be predicted in the intra prediction or in an inter prediction. In at least one implementation, the previous mode indices of a specific one of the reference blocks may be set as one of the reference mode indices when the specific reference block is predicted in the intra prediction. In at least one implementation, one of a plurality of non-angular mode indices may be set as one of the reference mode indices when the specific reference block is predicted in the inter prediction.

At block 54, the decoder module may determine that each of the reference mode indices may be greater than a specific one of a plurality of non-angular mode indices.

In at least one implementation, the intra candidate modes may include a plurality of non-angular candidate modes and a plurality of angular candidate modes. Thus, the intra mode indices may include the non-angular mode indices that each indicates one of the non-angular candidate modes and a plurality of angular mode indices that each indicates one of the angular candidate modes. In at least one implementation, the non-angular candidate modes may include a Planar mode and a DC mode. In at least one implementation, the non-angular mode index of the Planar mode may be equal to zero, and the non-angular mode index of the DC mode may be equal to one. In at least one implementation, each of the angular mode indices may be greater than one. In at least one implementation, the decoder module 222 in FIG. 2 may determine that the reference mode indices greater than the specific non-angular mode index may be selected from the angular mode indices when the specific non-angular mode index is set as the non-angular mode index of the DC mode. In at least one implementation, the decoder module 222 may determine the specific prediction list based on the reference mode indices when each of the reference mode indices is greater than the specific non-angular mode index.

At block 55, the decoder module may determine a difference (D) between the reference mode indices. In at least one implementation, the procedure may proceed to block 561 when the difference between the reference mode indices is equal to two. In at least one implementation, the procedure may proceed to block 562 when the difference between the reference mode indices is greater than two. In at least one implementation, the procedure may proceed to block 563 when the difference between the reference mode indices is equal to zero. In at least one implementation, the procedure may proceed to block 564 when the difference between the reference mode indices is equal to one.

In at least one implementation, with reference to FIG. 2, the decoder module 222 may compare the reference mode indices with each other. In at least one implementation, the number of the reference mode indices may be equal to two. Thus, there may be only one difference generated from the two reference mode indices. In at least one implementation, the decoder module 222 may select one of a plurality of candidate lists based on the comparison between the reference mode indices.

At block 561, the decoder module may select, according to the prediction index, the prediction mode based on a first one of a plurality of candidate lists having a first derived index derived by subtracting one from a smaller one of the reference mode indices when the difference is equal to two.

In at least one implementation, the candidate lists are different from each other. In at least one implementation, the first candidate list may include a plurality of first candidate modes selected from the intra candidate modes. In at least one implementation, the other unselected intra candidate modes may be added to the other prediction list when the first candidate modes in the first candidate list are selected from the intra candidate modes to add to the specific prediction list. In at least one implementation, the first candidate modes may have a plurality of first derived indices derived based on the reference mode indices. In at least one implementation, a first one and a second one of the first derived indices may be equal to the reference mode indices, and therefore, the first one and the second one of the first candidate modes may be the neighboring modes. In at least one implementation, a third one of the first derived indices may be equal to a first derived value determined by adding one to a smaller one of the reference mode indices. In at least one implementation, a fourth one of the first derived indices may be equal to a second derived value determined by subtracting one from the smaller one the reference mode indices. In at least one implementation, a fifth one of the first derived indices may be equal to a third derived value determined by adding one to a larger one of the reference mode indices. In at least one implementation, the second derived value may be equal to a fourth derived value derived by subtracting three from the larger one the reference mode indices, since the deference between the reference mode indices are equal to two.

In at least one implementation, the first derived value determined by adding one to the smaller one of the reference mode indices may be equal to an intermediate value between the reference mode indices, since the difference between the reference mode indices may be equal to two. Thus, the second derived value, the smaller one of the reference mode indices, the first derived value, the larger one of the reference mode indices, and the third derived value may be five consecutive integers.

In at least one implementation, the number of the intra candidate modes may be equal to N. In at least one implementation, the number of the angular candidate modes may be equal to N−2 when the number of the non-angular candidate modes is equal to two. In addition, the angular mode indices may be equal to an index value selected from a first range within two to N−1 when the intra mode indices are included in a second range within zero to N−1 and the non-angular mode indices may be equal to zero or one. In at least one implantation, the second derived value may be equal to the specific non-angular mode index when the smaller one of the reference mode indices is equal to two. Thus, the second derived value may be further adjusted to N−2. In at least one implantation, the third derived value may be equal to N when the larger one of the reference mode indices is equal to N−1. Thus, the second derived value may be further adjusted to 3, since the intra mode indices are different from N.

At block 562, the decoder module may select, according to the prediction index, the prediction mode based on a second one of the candidate lists having a second derived index excluded from the first candidate list when the difference is greater than two.

In at least one implementation, the second candidate list may include a plurality of second candidate modes selected from the intra candidate modes. In at least one implementation, the other unselected intra candidate modes may be added to the other prediction list when the second candidate modes in the second candidate list are selected from the intra candidate modes to add to the specific prediction list. In at least one implementation, the second candidate modes may have the second derived indices derived based on the reference mode indices. In at least one implementation, a first one and a second one of the second derived indices may be equal to the reference mode indices, so the first one and the second one of the second candidate modes may be the neighboring modes. In at least one implementation, a third one of the second derived indices may be derived by subtracting one from the larger one of the reference mode indices. In at least one implementation, the third one of the second derived indices is excluded in the first candidate list, since the first candidate list does not have a candidate mode that includes the derived index derived by subtracting one from the larger one of the reference mode indices.

In at least one implementation, at least one of the non-angular mode indices may be excluded from the specific prediction list when the specific reference line candidate different from the first reference line candidate is selected to reconstruct the block unit. Thus, some of the originally unselected intra candidate modes may be moved from the other prediction list to the specific prediction list, since the number of the intra candidate modes in the specific prediction list is insufficient. In at least one implementation, there may be four intra candidate modes adjacent to the two reference mode indices when the difference between two reference mode indices is greater than two. However, there may be only three intra candidate modes adjacent to the two reference mode indices when the difference between two reference mode indices is equal to two. Thus, the first candidate list for the difference equal to two may be different from the second candidate list for the difference greater than two, since the first candidate list needs another derived index for the specific prediction list.

At block 563, the decoder module may select, according to the prediction index, the prediction mode based on a third one of the candidate lists having a third derived index derived by adding two to one of the reference mode indices when the difference is equal to zero.

In at least one implementation, the third candidate list may include a plurality of third candidate modes selected from the intra candidate modes. In at least one implementation, the other unselected intra candidate modes may be added to the other prediction list when the third candidate modes in the third candidate list are selected from the intra candidate modes to add to the specific prediction list. In at least one implementation, the third candidate modes may have the third derived indices derived based on the reference mode indices. In at least one implementation, a first one and a second one of the third derived indices may be equal to the reference mode indices. As such, the first one and the second one of the third candidate modes may be the neighboring modes. In at least one implementation, a third one of the third derived indices may be derived by adding two to one of the reference mode indices. In at least one implementation, the third one of the third derived indices is excluded from the first candidate list and the second candidate list, since the first candidate list and the second candidate list do not have a candidate mode that includes the derived index derived by adding two to one of the reference mode indices. In at least one implantation, the third one of the third derived indices may be equal to N when the larger one of the reference mode indices is equal to N−2. Thus, the third one of the third derived indices may be further adjusted to 3, since the intra mode indices are different from N. In at least one implantation, the third one of the third derived indices may be equal to N+1 when the larger one of the reference mode indices is equal to N−1. Thus, the third one of the third derived indices may be further adjusted to 4, since the intra mode indices are different from N+1.

In at least one implementation, some of the originally unselected intra candidate modes may be moved from the other prediction list to the specific prediction list when the at least one of the non-angular mode indices is excluded from the specific prediction list. In at least one implementation, there may be two intra candidate modes adjacent to the two reference mode indices when the difference between two reference mode indices is equal to zero. However, the two adjacent intra candidate modes may be originally added to the third candidate list. Thus, the third candidate list may further include the third one of the third derived indices.

At block 564, the decoder module may select, according to the prediction index, the prediction mode based on a fourth one of the candidate lists having a fourth derived index derived by subtracting two from the smaller one of the reference mode indices when the difference is equal to one.

In at least one implementation, the fourth candidate list may include a plurality of fourth candidate modes selected from the intra candidate modes. In at least one implementation, the other unselected intra candidate modes may be added to the other prediction list when the fourth candidate modes in the fourth candidate list are selected from the intra candidate modes to add to the specific prediction list. In at least one implementation, the fourth candidate modes may have the fourth derived indices derived based on the reference mode indices. In at least one implementation, a first one and a second one of the fourth derived indices may be equal to the reference mode indices, so the first one and the second one of the fourth candidate modes may be the neighboring modes. In at least one implementation, a third one of the fourth derived indices may be derived by subtracting two from the smaller one of the reference mode indices. In at least one implementation, the third one of the fourth derived indices is excluded in the first candidate list, the second candidate list and the third candidate list, since the first candidate list, the second candidate list, and the third candidate list do not have a candidate mode that includes the derived index derived by subtracting two from the smaller one of the reference mode indices. In at least one implantation, the third one of the fourth derived indices may be equal to the specific non-angular mode index when the smaller one of the reference mode indices is equal to three. Thus, the third one of the fourth derived indices may be further adjusted to N−2. In at least one implantation, the third one of the fourth derived indices may be equal to the other one of the non-angular mode indices when the larger one of the reference mode indices is equal to two. Thus, the third one of the fourth derived indices may be further adjusted to N−3.

In at least one implementation, some of the originally unselected intra candidate modes may be moved from the other prediction list to the specific prediction list when the at least one of the non-angular mode indices is excluded from the specific prediction list. In at least one implementation, there may be two intra candidate modes adjacent to the two reference mode indices when the difference between two reference mode indices is equal to one. However, the two adjacent intra candidate modes may be originally added in the fourth candidate list. Thus, the fourth candidate list may further include the third one of the fourth derived indices.

Returning to FIG. 5, at block 57, the decoder module may reconstruct the block unit based on the determined prediction parameters.

In at least one implementation, with reference to FIGS. 1 and 2, the inter prediction unit 22222 may generate a predicted component for one of a plurality of block components in the block unit based on the prediction mode and according to the candidate line samples in the specific reference line candidate. In at least one implementation, the first summer 2224 of the decoder module 222 in the destination device 12 may add the predicted components to a plurality of residual components, determined from the bitstream, to reconstruct the block unit. In addition, the decoder module 222 may reconstruct all of the other block units in the image frame for reconstructing the image frame and the video.

Figure 7:
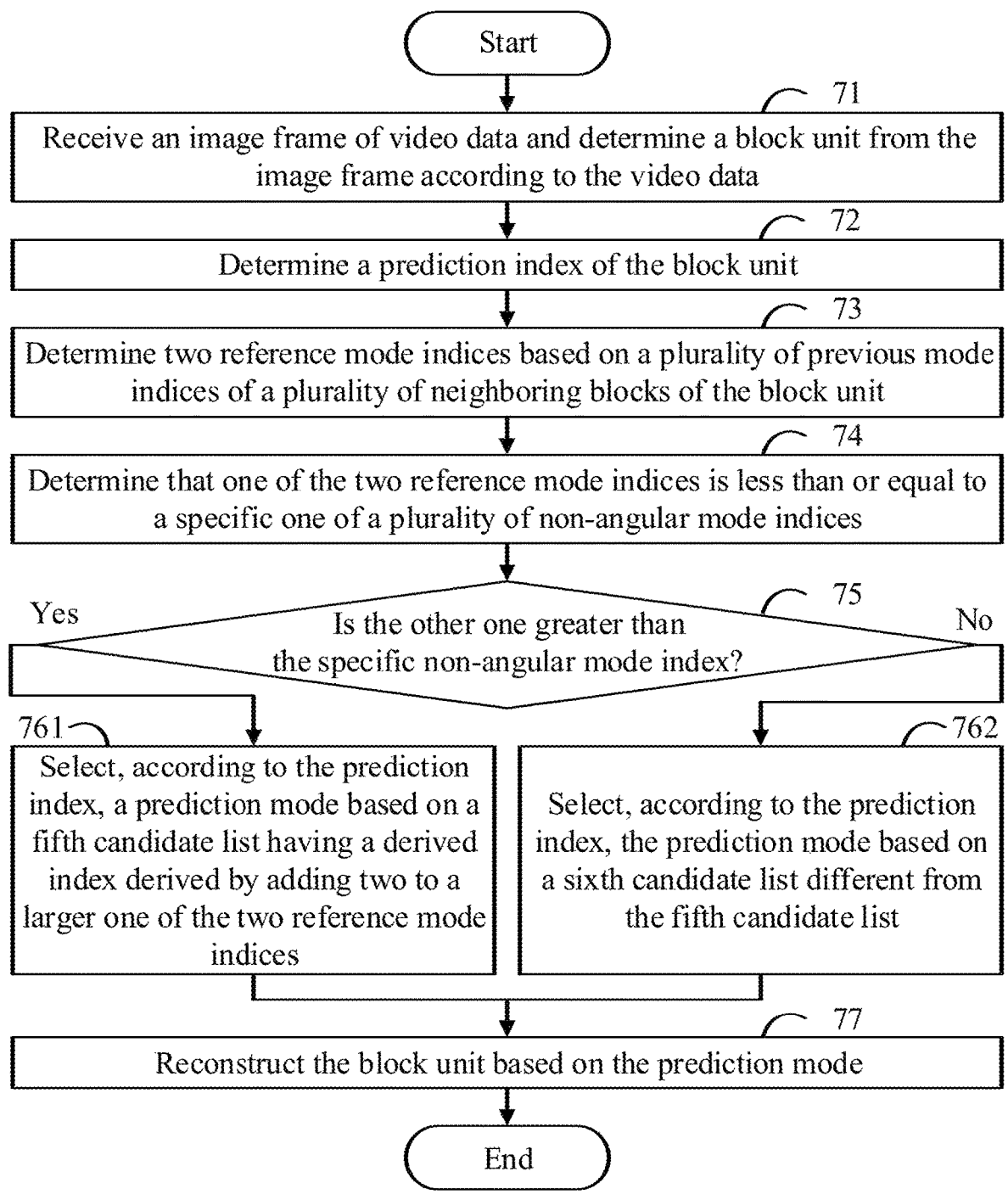
FIG. 7 illustrates a flowchart of an example reconstruction method for reconstructing a block unit by selecting a prediction mode based on a plurality of candidate lists, according to an example implementation of the present application.

FIG. 7 illustrates a flowchart of an example reconstruction method for reconstructing a block unit by selecting a prediction mode based on a plurality of candidate lists, according to an example implementation of the present application. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 7 may represent one or more processes, methods, or subroutines, carried out in the example method. Furthermore, the order of blocks is illustrative only and may change. Additional blocks may be added or less blocks may be utilized without departing from the present disclosure.

At block 71, a decoder module may receive an image frame of video data and determine a block unit from the image frame according to the video data.

In at least one implementation, the video data may be a bitstream. In at least one implementation, with reference to FIGS. 1 and 2, the destination device 12 may receive the bitstream from an encoder, such as the source device 11, via the second interface 123 of the destination device 12. The second interface 123 may provide the bitstream to the decoder module 222. The decoder module 222 may determine the image frame based on the bitstream, and divide the image frame to determine the block unit according to a plurality of partition indications in the bitstream. For example, the decoder module 222 may divide the image frames to generate a plurality of coding tree units, and may further divide one of the coding tree units to determine the block unit according to the partition indications (e.g., based on a video coding standard).

In at least one implementation, the entropy decoding unit 2221 in FIG. 2 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 72, the decoder module may determine a prediction index of the block unit.

In at least one implementation, with reference to FIG. 2, the decoder module 222 may select a prediction mode from a plurality of intra candidate modes of an intra mode list based on the prediction index when the block unit is predicted in an intra prediction. In at least one implementation, the prediction index may be included in the prediction indications for the block unit. In at least one implementation, the intra candidate modes have a plurality of intra mode indices that each indicates one of the intra candidate modes.

In at least one implementation, the intra candidate modes may be categorized into a plurality of prediction lists, and the prediction indications may further include a list flag indicating that the prediction mode may be included in a specific one of the prediction lists. In at least one implementation, the number of the prediction lists may be equal to two. Thus, the prediction mode may be included in the specific prediction list when the list flag is equal to one. In addition, the prediction mode may be included in the other of the two prediction lists when the list flag is equal to zero. In at least one implementation, the number of the intra candidate modes in the specific prediction list may be different from the number of the intra candidate modes in the other of the two prediction lists.

In at least one implementation, there is a plurality of reference line candidates neighboring the block unit. In at least one implementation, each of the reference line candidates includes a plurality of candidate line samples. In at least one implementation, with reference to FIGS. 1 and 2, the encoder module 112 may select one of the reference line candidates for predicting the block unit, and may provide a reference line index indicating the selected reference line candidate to the destination device 12. In the implementation, the decoder module 222 may determine the selected reference line candidate based on the reference line index, and the intra prediction unit 22221 may determine the candidate line samples in the selected reference line candidate as a plurality of reference line samples. Thus, the decoder module 222 may reconstruct the block unit based on the reference line samples.

In at least one implementation, the encoder module 112 may select the intra prediction mode from the prediction lists when the encoder module 112 selects the first one of the reference line candidate to predict the block unit. In at least one implementation, the encoder module 112 may select the prediction mode only from the specific prediction list when the encoder module 112 selects a specific one of the reference line candidates different from the first reference line candidate to predict the block unit. In at least one implementation, the decoder module 222 may determine the specific reference line candidate based on the reference line index, select the prediction mode from the specific prediction list, and reconstruct the block unit based on the prediction mode according to the candidate line samples in the specific reference line candidate.

Returning to FIG. 7, at block 73, the decoder module may determine a plurality of reference mode indices for the block unit based on a plurality of previous mode indices of a plurality of neighboring blocks of the block unit.

In at least one implementation, with reference to FIG. 2, the decoder module 222 may determine the neighboring blocks and further determine a plurality of neighboring modes of the neighboring blocks when the neighboring blocks are predicted in the intra prediction. In at least one implementation, the neighboring modes may be selected from the intra candidate modes, so the previous mode indices may be selected from the intra mode indices. Then, the previous mode indices may be set as the reference modes indices for determining the prediction mode of the block unit. In at least one implementation, the number of the determined neighboring modes may be equal to two, so both of the number of the previous mode indices and the number of the reference mode indices may be equal to two.

In at least one implementation, the neighboring blocks may be a plurality of sub-blocks located at a plurality of predefined neighboring locations of the block unit. In at least one implementation, each of the sub-blocks may cover at least one sample location in the image frame. In at least one implementation, the at least one sample location in a specific one of the sub-blocks may be identical to one of the predefined neighboring locations when the number of the at least one sample location in the specific sub-block is equal to one. In at least one implementation, the at least one sample location in a specific one of the sub-blocks may cover one of the predefined neighboring locations when the number of the at least one sample location in the specific sub-block is greater than one.

In at least one implementation, there may be a plurality of reference blocks neighboring the block unit. In at least one implementation, the reference blocks may be predicted in the intra prediction or in an inter prediction. In at least one implementation, the previous mode indices of a specific one of the reference blocks may be set as one of the reference mode indices when the specific reference block is predicted in the intra prediction. In at least one implementation, one of a plurality of non-angular mode indices may be set as one of the reference mode indices when the specific reference block is predicted in the inter prediction.

At block 74, the decoder module may determine that one of the reference mode indices may be less than or equal to a specific one of a plurality of non-angular mode indices.

In at least one implementation, the intra candidate modes may include a plurality of non-angular candidate modes and a plurality of angular candidate modes. Thus, the intra mode indices may include the non-angular mode indices that each indicates one of the non-angular candidate modes and a plurality of angular mode indices that each indicates one of the angular candidate modes. In at least one implementation, the non-angular candidate modes may include a Planar mode and a DC mode. In at least one implementation, the non-angular mode index of the Planar mode may be equal to zero, and the non-angular mode index of the DC mode may be equal to one. In at least one implementation, each of the angular mode indices may be greater than one. In at least one implementation, with reference to FIG. 2, the decoder module 222 may determine that a specific one of the reference mode indices less than or equal to the specific non-angular mode index may be selected from the non-angular mode indices when the specific non-angular mode index is set as the non-angular mode index of the DC mode. In at least one implementation, the decoder module 222 may determine whether the specific prediction list is derived based on the reference mode indices when one of the reference mode indices is less than or equal to the specific non-angular mode index.

At block 75, the decoder module may determine whether the other one of the reference mode indices is greater than the specific non-angular mode index. In at least one implementation, the procedure may proceed to block 761 when the other reference mode index is greater than the specific non-angular mode index. In at least one implementation, the procedure may proceed to block 762 when the other reference mode index is also less than or equal to the specific non-angular mode index.

In at least one implementation, with reference to FIG. 2, the decoder module 222 may determine whether each of the reference mode indices is less than or equal to the reference mode indices. In at least one implementation, the other one of the reference mode indices may be selected from the angular mode indices when the other one of the reference mode indices is greater than the specific non-angular mode index. Thus, the decoder module 222 may select a specific one of a plurality of candidate lists having a derived index derived based on the other one of the reference mode indices. In at least one implementation, each of the reference mode indices are selected from the non-angular mode indices when the other one of the reference mode indices is less than or equal to the specific non-angular mode index. Thus, the decoder module 222 may determine a predefined candidate list different from the specific candidate list.

At block 761, the decoder module may select, according to the prediction index, the prediction mode based on a fifth one of the candidate lists having the derived index derived by adding two to a larger one of the reference mode indices.

In at least one implementation, the fifth candidate list may include a plurality of fifth candidate modes selected from the intra candidate modes. In at least one implementation, the other unselected intra candidate modes may be added to the other prediction list when the fifth candidate modes in the fifth candidate list are selected from the intra candidate modes to add to the specific prediction list. In at least one implementation, the fifth candidate modes may have a plurality of fifth derived indices derived based on the other one of the reference mode indices. In at least one implementation, a first one of the fifth derived indices may be equal to the other one of the reference mode indices, so the first one of the fifth candidate modes may be one of the neighboring modes. In at least one implementation, a second one of the fifth derived indices may be derived by adding two to the other one of the reference mode indices.

In at least one implementation, the number of the intra candidate modes may be equal to N. In at least one implementation, the number of the angular candidate modes may be equal to N−2 when the number of the non-angular candidate modes is equal to two. In addition, the angular mode indices may be equal to an index value selected from a first range within two to N−1 when the intra mode indices are included in a second range within zero to N−1 and the non-angular mode indices may be equal to zero or one. In at least one implantation, the second one of the fifth derived indices may be equal to N when the other one of the reference mode indices is equal to N−2. Thus, the second one of the fifth derived indices may be further adjusted to 3, since the intra mode indices are different from N. In at least one implantation, the second one of the fifth derived indices may be equal to N+1 when the other one of the reference mode indices is equal to N−1. Thus, the second one of the fifth derived indices may be further adjusted to, since the intra mode indices are different from N+1.

In at least one implementation, at least one of the non-angular mode indices may be excluded from the specific prediction list when the specific reference line candidate different from the first reference line candidate is selected to reconstruct the block unit. Thus, some of the originally unselected intra candidate modes may be moved from the other prediction list to the specific prediction list, since the number of the intra candidate modes in the specific prediction list is insufficient. In at least one implementation, there may be only two intra candidate modes adjacent to the other one of the reference mode indices. However, the two adjacent intra candidate modes may be originally added in the fifth candidate list. Thus, the fifth candidate list may further include the second one of the fifth derived indices.

At block 762, the decoder module may select, according to the prediction index, the prediction mode based on a sixth one of the candidate lists different from the fifth candidate list.

In at least one implementation, the sixth candidate list may include a plurality of sixth candidate modes selected from the intra candidate modes. In at least one implementation, the other unselected intra candidate modes may be added to the other prediction list when the sixth candidate modes in the sixth candidate list are selected from the intra candidate modes to add to the specific prediction list. In at least one implementation, the sixth candidate modes may be a plurality of predefined modes. In at least one implementation, with reference to FIGS. 1 and 2, the predefined modes may be pre-defined in the decoder module 222 and the encoder module 112. Thus, the sixth candidate modes may be independent from the reference mode indices. In at least one implementation, the sixth candidate list having the predefined modes may be different from the fifth candidate list.

At block 77, the decoder module may reconstruct the block unit based on the determined prediction parameters.

In at least one implementation, with reference to FIGS. 1 and 2, the inter prediction unit 22222 may generate a predicted component for one of a plurality of block components in the block unit based on the prediction mode according to the candidate line samples in the specific reference line candidate. In at least one implementation, the first summer 2224 of the decoder module 222 in the destination device 12 may add the predicted components to a plurality of residual components determined from the bitstream to reconstruct the block unit. In addition, the decoder module 222 may reconstruct all of the other block units in the image frame for reconstructing the image frame and the video.

Figure 8:
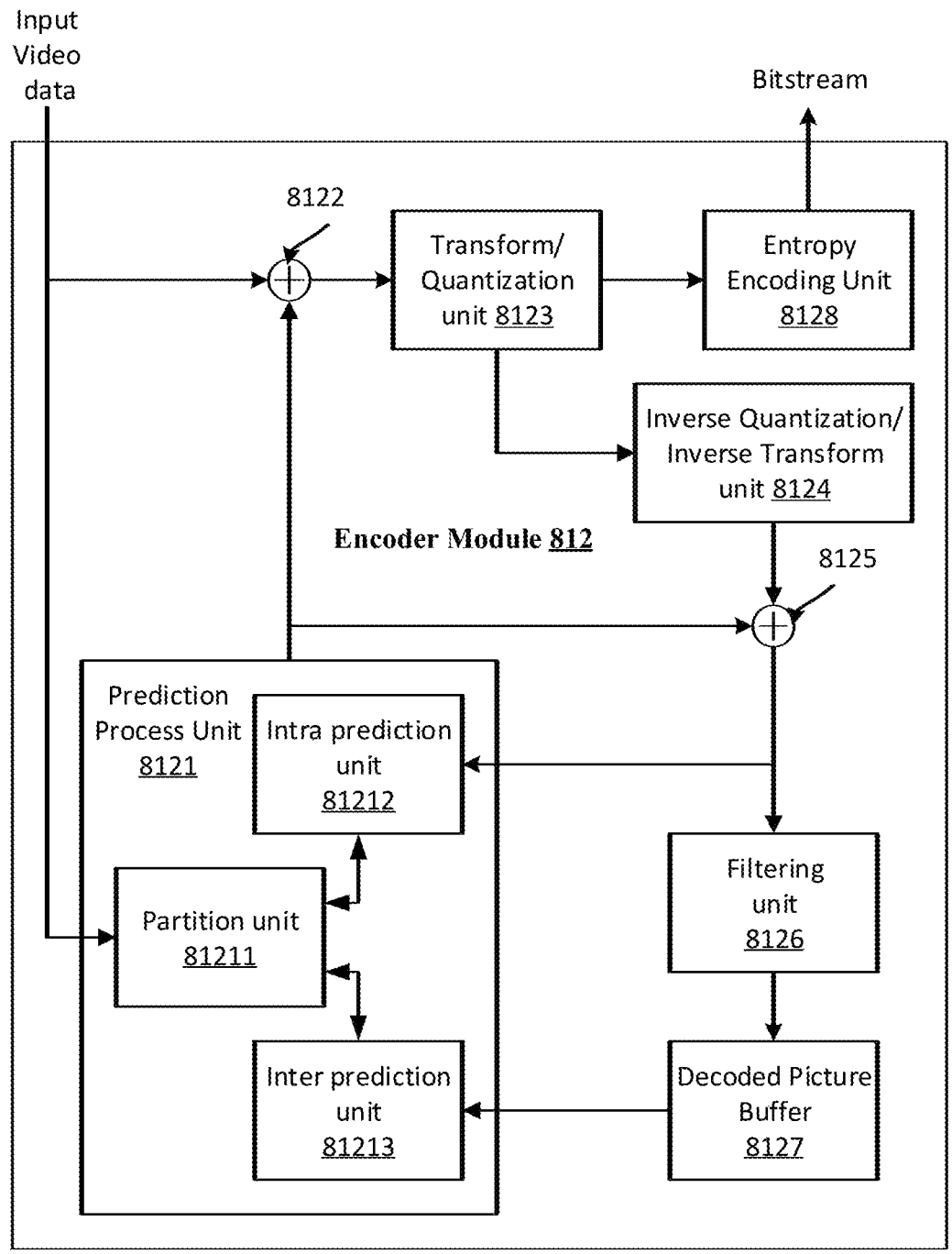
FIG. 8 is a block diagram of an example encoder module of the source device in the system of FIG. 1, according to an example implementation of the present application.

FIG. 8 is a block diagram of an encoder module 812 representing an example implementation of the encoder module 112 of the source device 11 in the system of FIG. 1, according to an example implementation of the present application. In at least one implementation, the encoder module 812 may include a prediction processor (e.g., a prediction process unit 8121), at least one summer (e.g., a first summer 8122 and a second summer 8125), a quantization/inverse transform processor (e.g., a transform/quantization unit 8123), an inverse quantization/inverse transform processor (e.g., an inverse quantization/inverse transform unit 8124), a filter (e.g., a filtering unit 8126), a decoded picture buffer (e.g., a decoded picture buffer 8127), and an entropy encoder (e.g., an entropy encoding unit 8128). In at least one implementation, the prediction process unit 8121 of the encoder module 812 may further include a partition processor (e.g., a partition unit 81211), an intra prediction processor (e.g., an intra prediction unit 81212), and an inter prediction processor (e.g., an inter prediction unit 81213). In at least one implementation, the encoder module 812 may receive the source video and encode the source video to output a bitstream.

In at least one implementation, the encoder module 812 may receive a source video including a plurality of image frames and then divide the image frames according to a coding structure. In at least one implementation, each of the image frames may be divided into at least one image block. The at least one image block may include a luminance block having a plurality of luminance samples, and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit. In at least one implementation, the encoder module 812 may perform additional sub-divisions of the source video. It should be noted that the present implementations described herein are generally applicable to video coding, regardless of how the source video is partitioned prior to, and/or during, the encoding.

In at least one implementation, during the encoding process, the prediction process unit 8121 may receive a current image block of a specific one of the image frames. The current image block may be one of the luminance block and the at least one of the chrominance block in the specific image frame. The partition unit 81211 may divide the current image block into multiple block units. The intra prediction unit 81212 may perform intra-predictive coding of a current block unit relative to one or more neighboring blocks in the same frame as the current block unit to provide spatial prediction. The inter prediction unit 81213 may perform inter-predictive coding of the current block unit relative to one or more blocks in one or more reference image blocks to provide temporal prediction.

In at least one implementation, the prediction process unit 8121 may select one of the coding results generated by the intra prediction unit 81212 and the inter prediction unit 81213 based on a mode selection method, such as a cost function. In at least one implementation, the mode selection method may be a rate-distortion optimization (RDO) process. The prediction process unit 8121 may determine the selected coding result, and provide a predicted block corresponding to the selected coding result to the first summer 8122 for generating a residual block and to the second summer 8125 for reconstructing the encoded block unit. In at least one implementation, the prediction process unit 8121 may further provide syntax elements, such as motion vectors, intra-mode indicators, partition information, and other syntax information, to the entropy encoding unit 8128.

In at least one implementation, the intra prediction unit 81212 may intra-predict the current block unit. In at least one implementation, the intra prediction unit 81212 may determine an intra-prediction mode directing toward reconstructed sample neighboring the current block unit to encode the current block unit. In at least one implementation, the intra prediction unit 81212 may encode the current block unit using various intra-prediction modes, and the intra prediction unit 81212 or the prediction process unit 8121 may select an appropriate intra-prediction mode from the tested modes. In at least one implementation, the intra prediction unit 81212 may encode the current block unit using a cross component prediction mode to predict one of the two chroma components of the current block unit based on the luma components of the current block unit. In addition, the intra prediction unit 81212 may predict a first one of the two chroma components of the current block unit based on the other of the two chroma components of the current block unit.

In at least one implementation, the inter prediction unit 81213 may inter-predict the current block unit as an alternative to the intra-prediction performed by the intra prediction unit 81212, as described above. The inter prediction unit

81213 may perform a motion estimation to estimate a motion of the current block unit for generating a motion vector. The motion vector may indicate a displacement of the current block unit within the current image block relative to a reference block unit within a reference image block. In at least one implementation, the inter prediction unit 81213 may receive at least one reference image block stored in the decoded picture buffer 8127 and estimate the motion based on the received reference image blocks to generate the motion vector.

In at least one implementation, the first summer 8122 may generate the residual block by subtracting the prediction block determined by the prediction process unit 8121 from the original current block unit. The first summer 8122 may represent the component or components that perform this subtraction operation.

In at least one implementation, the transform/quantization unit 8123 may apply a transform to the residual block to generate a residual transform coefficient, and then may quantize the residual transform coefficients to further reduce bit rate. In at least one implementation, the transform may be one of a DCT, DST, AMT, MDNSST, HyGT, signal dependent transform, KLT, wavelet transform, integer transform, sub-band transform or a conceptually similar transform. In at least one implementation, the transform may convert the residual information from a pixel value domain to a transform domain, such as a frequency domain. In at least one implementation, the degree of quantization may be modified by adjusting a quantization parameter. In at least one implementation, the transform/quantization unit 8123 may perform a scan of the matrix including the quantized transform coefficients. Alternatively, the entropy encoding unit 8128 may perform the scan.

In at least one implementation, the entropy encoding unit 8128 may receive a plurality of syntax elements including quantization parameter, transform data, motion vectors, intra modes, partition information, and other syntax information, from the prediction process unit 8121 and the transform/quantization unit 8123, and may encode the syntax elements into the bitstream. In at least one implementation, the entropy encoding unit 8128 may entropy encode the quantized transform coefficients. In at least one implementation, the entropy encoding unit 8128 may perform CAVLC, CABAC, SBAC, PIPE coding or another entropy coding technique to generate an encoded bitstream. In at least one implementation, the encoded bitstream may be transmitted to another device (e.g., the destination device 12 in FIG. 1) or archived for later transmission or retrieval.

In at least one implementation, the inverse quantization/inverse transform unit 8124 may apply inverse quantization and inverse transformation to reconstruct the residual block in the pixel domain for later use as a reference block. In at least one implementation, the second summer 8125 may add the reconstructed residual block to the prediction block provided from the prediction process unit 8121 to produce a reconstructed block for storage in the decoded picture buffer 8127.

In at least one implementation, the filtering unit 8126 may include a deblocking filter, a SAO filter, a bilateral filter, and/or an ALF to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the second summer 8125.

In at least one implementation, the decoded picture buffer 8127 may be a reference picture memory that stores the reference block for use in encoding video by the encoder module 812, e.g., in intra- or inter-coding modes. The decoded picture buffer 8127 may be formed by any of a variety of memory devices, such as DRAM, including SDRAM, MRAM, RRAM), or other types of memory devices. In at least one implementation, the decoded picture buffer 8127 may be on-chip with other components of the encoder module 812, or off-chip relative to those components.

Figure 9:
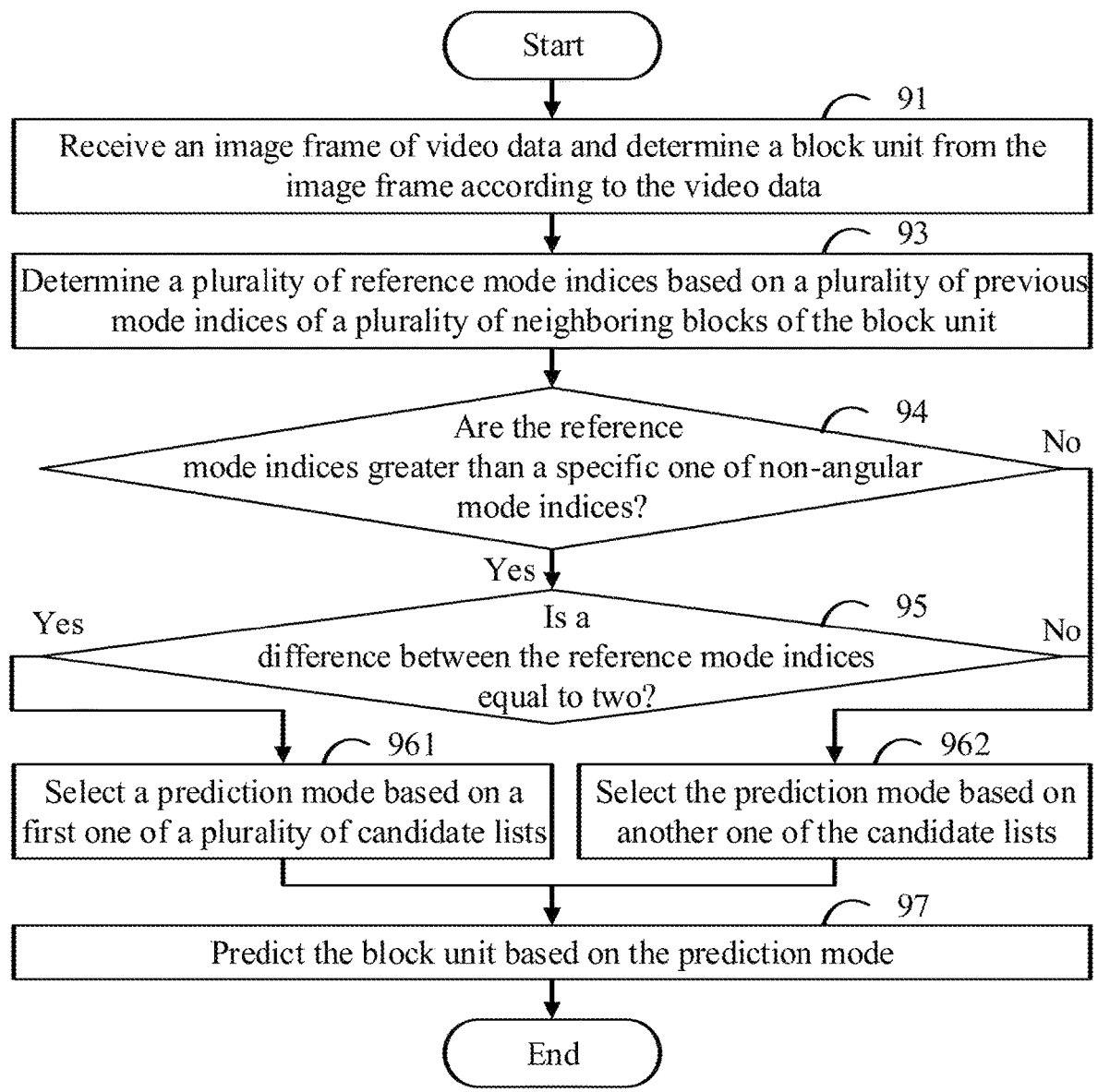
FIG. 9 illustrates a flowchart of an example prediction method for predicting a block unit by selecting a prediction mode based on a plurality of candidate lists, according to an example implementation of the present application.

FIG. 9 illustrates a flowchart of an example prediction method for predicting a block unit by selecting a prediction mode based on a plurality of candidate lists, according to an example implementation of the present application. The example method is provided by way of example only, as there are a variety of ways to carry out the method. The method described below may be carried out using the configurations illustrated in FIG. 1 and FIG. 8, for example, and various elements of these figures are referenced in explaining the example method. Each block shown in FIG. 9 may represent one or more processes, methods, or subroutines, carried out in the example method. Furthermore, the order of blocks is illustrative only and may change. Additional blocks may be added or less blocks may be utilized without departing from the present disclosure.

At block 91, an encoder module may receive an image frame of video data and determine a block unit from the image frame according to the video data.

In at least one implementation, the video data may be a video. In at least one implementation, with reference to FIGS. 1 and 8, the source device 11 may receive the video by the source module 111. The encoder module 812 may determine the image frame from the video and divide the image frame to determine the block unit.

In at least one implementation, the prediction process unit 8121 of the source device 11 may determine the block unit from the video via the partition unit 81211, and then the encoder module 812 may provide a plurality of partition indications into a bitstream based on a partition result of the partition unit 81211.

At block 93, the encoder module may determine a plurality of reference mode indices for the block unit based on a plurality of previous mode indices of a plurality of neighboring blocks of the block unit.

In at least one implementation, the encoder module 812 may determine the neighboring blocks and further determine a plurality of neighboring modes of the neighboring blocks when the neighboring blocks are predicted in the intra prediction. In at least one implementation, the neighboring modes may be selected from a plurality of intra candidate modes of an intra mode list, so the previous mode indices may be selected from a plurality of intra mode indices. In at least one implementation, the intra candidate modes have the intra mode indices that each indicates one of the intra candidate modes. Then, the previous mode indices may be set as the reference modes indices for determining the prediction mode of the block unit. In at least one implementation, the number of the determined neighboring modes may be equal to two, so both of the number of the previous mode indices and the number of the reference mode indices may be equal to two.

In at least one implementation, the neighboring blocks may be a plurality of sub-blocks located at a plurality of predefined neighboring locations of the block unit. In at least one implementation, each of the sub-blocks may cover at least one sample location in the image frame. In at least one implementation, the at least one sample location in a specific one of the sub-blocks may be identical to one of the predefined neighboring locations when the number of the at least one sample location in the specific sub-block is equal to one. In at least one implementation, the at least one sample location in a specific one of the sub-blocks may cover one of the predefined neighboring locations when the number of the at least one sample location in the specific sub-block is greater than one.

In at least one implementation, there may be a plurality of reference blocks neighboring the block unit. In at least one implementation, the reference blocks may be predicted in the intra prediction or in an inter prediction. In at least one implementation, the previous mode indices of a specific one of the reference blocks may be set as one of the reference mode indices when the specific reference block is predicted in the intra prediction. In at least one implementation, one of a plurality of non-angular mode indices may be set as one of the reference mode indices when the specific reference block is predicted in the inter prediction.

At block 94, the encoder module may determine whether the reference mode indices are greater than a specific one of a plurality of non-angular mode indices. In at least one implementation, the procedure may proceed to block 95 when each of the reference mode indices is greater than the specific non-angular mode index. In at least one implementation, the procedure may proceed to block 962 when at least one of the reference mode indices is less than or equal to the specific non-angular mode index.

In at least one implementation, the intra candidate modes may include a plurality of non-angular candidate modes and a plurality of angular candidate modes. Thus, the intra mode indices may include the non-angular mode indices that each indicates one of the non-angular candidate modes and a plurality of angular mode indices that each indicates one of the angular candidate modes. In at least one implementation, the non-angular candidate modes may include a Planar mode and a DC mode. In at least one implementation, the non-angular mode index of the Planar mode may be equal to zero, and the non-angular mode index of the DC mode may be equal to one. In at least one implementation, each of the angular mode indices may be greater than one. In at least one implementation, the encoder module 812 may determine that the reference mode indices greater than the specific non-angular mode index may be selected from the angular mode indices when the specific non-angular mode index is set as the non-angular mode index of the DC mode.

In at least one implementation, the intra candidate modes may be categorized into a plurality of prediction lists. In at least one implementation, the number of the prediction lists may be equal to two. In at least one implementation, the encoder module 812 may determine a specific one of the prediction lists based on the reference mode indices when each of the reference mode indices is greater than the specific non-angular mode index. In at least one implementation, the encoder module 812 may determine the specific prediction list based on a specific one of the reference mode indices when the specific reference mode index is greater than the specific non-angular mode index and the other reference mode indices may be less than or equal to the specific non-angular mode index. In at least one implementation, the encoder module 812 may determine the specific prediction list based on a predefined candidate list when each of the reference mode indices is less than or equal to the specific non-angular mode index.

At block 95, the encoder module may determine whether a difference between the reference mode indices is equal to two. In at least one implementation, the procedure may proceed to block 961 when the difference between the reference mode indices is equal to two. In at least one implementation, the procedure may proceed to block 962 when the difference between the reference mode indices is different from two.

In at least one implementation, the encoder module 812 may compare the reference mode indices with each other. In at least one implementation, the number of the reference mode indices may be equal to two. Thus, there may be only one difference value generated from the two reference mode indices. In at least one implementation, the decoder module 222 may compare the difference between the two reference mode indices with two for determining the specific prediction list.

At block 961, the encoder module may select the prediction mode based on a first one of a plurality of candidate lists.

In at least one implementation, the candidate lists are different from each other. In at least one implementation, the encoder module 812 may select one of the candidate lists based on the reference mode indices. In at least one implementation, the encoder module 812 may select the first one of the candidate lists as the specific prediction list for determining the prediction mode of the block unit when the difference between the reference mode indices is equal to two. In at least one implementation, the first candidate list may include a plurality of first candidate modes selected from the intra candidate modes. In at least one implementation, the other unselected intra candidate modes may be added to the other prediction list when the first candidate modes in the first candidate list are selected from the intra candidate modes to add to the specific prediction list. In at least one implementation, the number of the first candidate modes may be equal to six. In at least one implementation, the first candidate modes may have a plurality of first derived indices derived based on the reference mode indices. In at least one implementation, one of the first derived indices may be equal to a derived value determined by subtracting one from a smaller one of the reference mode indices.

In at least one implementation, the number of the intra candidate modes may be equal to N. In at least one implementation, the number of the intra candidate modes may be equal to N−2 when the number of the non-angular candidate modes is equal to two. In addition, the angular mode indices may be equal to an index value selected from two to N−1 when the non-angular mode indices are equal to zero or one. In at least one implantation, the derived value may be equal to the specific non-angular mode index when the smaller one of the reference mode indices is equal to two. Thus, the second derived value may be adjusted to N−2.

In at least one implementation, the intra prediction unit 81212 may predict the block unit according to the intra candidate modes to generate a plurality of predicted results. In at least one implementation, the prediction process unit 8121 may select one of predicted results based on a mode selection method, such as a cost function. In at least one implementation, the mode selection method may be a rate-distortion optimization (RDO) process. In the implementation, the prediction process unit 8121 sets one of the intra candidate modes used to generate the selected coding result as the prediction mode of the block unit. In at least one implementation, the selected intra candidate modes may include in the specific prediction list or the other prediction list.

At block 962, the decoder module may select the prediction mode based on another one of the plurality of candidate lists (e.g., any other candidate list except the first candidate list).

In at least one implementation, the other candidate lists may be different from the first candidate list. In at least one implementation, the selected other candidate list may include a plurality of second candidate modes selected from the intra candidate modes. In at least one implementation, the other unselected intra candidate modes may be added to the other prediction list when the second candidate modes in the selected other candidate list are selected from the intra candidate modes to add to the specific prediction list. In at least one implementation, the number of the second candidate modes may be equal to six. In at least one implementation, the second candidate modes may have a plurality of second derived indices derived based on at least one of the reference mode indices. In at least one implementation, at least one of the second derived indices may be different from the first derived indices, since the candidate lists may be different from each other. For example, the decoder module 222 may select the second candidate modes into the other prediction list when the difference between the reference mode indices is greater than two.

In at least one implementation, at least one of the non-angular mode indices may be excluded from the specific prediction list. Thus, some of the originally unselected intra candidate modes may be moved from the other prediction list to the specific prediction list, since the number of the intra candidate mode in the specific prediction list is insufficient. In at least one implementation, there may be four intra candidate modes adjacent to the two reference mode indices when the difference between the two reference mode indices is greater than two. In addition, there may be two intra candidate modes adjacent to the two reference mode indices when the difference between the two reference mode indices is equal to one or zero However, there may be three intra candidate modes adjacent to the two reference mode indices when the difference between two reference mode indices is equal to two. Thus, the first candidate list for the difference equal to two may be different from the other candidate lists for the difference greater than two or equal one or zero, since the first candidate list needs another derived index for the specific prediction list.

In at least one implementation, the candidate lists may include a second candidate list, a third candidate list, a fourth candidate list, and fifth candidate list. In at least one implementation, the selected other candidate list is the second candidate list when the reference mode indices are greater than the specific non-angular mode index and the difference is greater than two. In at least one implementation, the selected other candidate list is the third candidate list having the derived index derived by adding two to one of the reference mode indices when the reference mode indices are greater than the specific non-angular mode index and the difference is equal to zero. In at least one implementation, t the selected other candidate list is the fourth candidate list having the derived index derived by subtracting two from the smaller one of the reference mode indices when the reference mode indices are greater than the specific non-angular mode index and the difference is equal to one. In at least one implementation, the selected other candidate list is the fifth candidate list having the derived index derived by adding two to the larger one of the reference mode indices when one of the reference mode indices is less than or equal to the specific non-angular mode index and the other of the reference mode indices is greater than the specific non-angular mode index.

In at least one implementation, the intra prediction unit 81212 may predicts the block unit according to the intra candidate modes to generate a plurality of predicted results. In at least one implementation, the prediction process unit 8121 may select one of predicted results based on a mode selection method, such as a cost function. In at least one implementation, the mode selection method may be the RDO. In the implementation, the prediction process unit 8121 sets one of the intra candidate modes used to generate the selected coding result as the prediction mode of the block unit. In at least one implementation, the selected intra candidate modes may include in the specific prediction list or the other prediction list.

At block 97, the encoder module may predict the block unit based on the determined prediction parameters.

In at least one implementation, with reference to FIGS. 1 and 8, the intra prediction unit 81212 may generate a predicted component for one of a plurality of block components in the block unit based on the prediction mode. In at least one implementation, the first summer 8122 of the encoder module 812 in the source device 11 may generate a plurality of residual samples based on the predicted components, and provide, to the destination device 12, a bitstream including a plurality of coefficients corresponding to the residual samples. In addition, the encoder module 812 may predict all of the other block units in the image frame for predicting the image frame and the video. In at least one implementation, the bitstream may include a list flag indicating whether the prediction mode is included in the specific prediction list.

From the above description, it is manifest that various techniques may be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of decoding a bitstream by an electronic device, the method comprising:
   receiving an image frame of the bitstream;
   determining a block unit from the image frame;
   determining a prediction index of the block unit from the bitstream;
   determining a plurality of reference mode indices based on a plurality of previous mode indices of a plurality of neighboring blocks of the block unit;
   determining whether each of the plurality of reference mode indices is greater than a specific one of a plurality of non-angular mode indices;
   determining whether a difference between the plurality of reference mode indices is equal to two or greater than two when each of the plurality of reference mode indices is greater than the specific one of the plurality of non-angular mode indices;

selecting, according to the prediction index, a prediction mode based on a first candidate list when the difference between the plurality of reference mode indices is equal to two;

selecting, according to the prediction index, the prediction mode based on a second candidate list different from the first candidate list when the difference between the plurality of reference mode indices is greater than two; and reconstructing the block unit based on the prediction mode, wherein the first candidate list includes a plurality of first candidate modes having a plurality of first derived indices derived based on at least one of the plurality of reference mode indices, the second candidate list includes a plurality of second candidate modes having a plurality of second derived indices, and at least one of the plurality of second derived indices is different from the plurality of first derived indices.

2. The method according to claim 1, wherein the plurality of first derived indices are five consecutive integers including a plurality of index values of the plurality of reference mode indices, a first derived value derived by adding one to a smaller one of the plurality of reference mode indices, a second derived value derived by subtracting one from the smaller one of the plurality of reference mode indices, and a third derived value derived by adding one to a larger one of the plurality of reference mode indices.

3. The method according to claim 1, further comprising:
determining whether a reference line for predicting the block unit is different from a first one of a plurality of neighboring lines, wherein the plurality of neighboring lines neighbor the block unit and the first one of the plurality of neighboring lines is adjacent to the block unit; and selecting, according to the prediction index, the prediction mode when the reference line is different from the first one of the plurality of neighboring lines.

4. The method according to claim 1, further comprising:
determining whether the plurality of reference mode indices are equal to each other when each of the plurality of reference mode indices is greater than the specific one of the plurality of non-angular mode indices; and selecting, according to the prediction index, the prediction mode based on a third candidate list different from the first candidate list when the plurality of reference mode indices are equal to each other, wherein the third candidate list includes a plurality of third candidate modes having a plurality of third derived indices, and one of the plurality of third derived indices is derived by adding two to one of the plurality of reference mode indices.

5. The method according to claim 1, further comprising:
determining whether the difference between the plurality of reference mode indices is equal to one when each of the plurality of reference mode indices is greater than the specific one of the plurality of non-angular mode indices; and selecting, according to the prediction index, the prediction mode based on a third candidate list different from the first candidate list when the difference between the plurality of reference mode indices is equal to one, wherein the third candidate list includes a plurality of third candidate modes having a plurality of third derived indices, and one of the plurality of third derived indices is derived by subtracting two from a smaller one of the plurality of reference mode indices.

6. The method according to claim 1, further comprising:
determining whether one of the plurality of reference mode indices is greater than the specific one of the plurality of non-angular mode indices and other of the plurality of reference mode indices are less than or equal to the specific one of the plurality of non-angular mode indices; and selecting, according to the prediction index, the prediction mode based on a third candidate list different from the first candidate list when one of the plurality of reference mode indices is greater than the specific one of the plurality of non-angular mode indices and the other of the plurality of reference mode indices are less than or equal to the specific one of the plurality of non-angular mode indices, wherein the third candidate list includes a plurality of third candidate modes having a plurality of third derived indices, and one of the plurality of third derived indices is derived by adding two to a larger one of the plurality of reference mode indices.

7. The method according to claim 1, wherein, the specific one of the plurality of non-angular mode indices is equal to one and corresponds to a DC mode.

8. An electronic device for decoding a bitstream, the electronic device comprising:
at least one processor; and
a storage device coupled to the at least one processor and storing a plurality of instructions which, when executed by the at least one processor, causes the at least one processor to:

receiving an image frame of the bitstream;
determining a block unit from the image frame;
determine a prediction index of the block unit from the bitstream;
determine a plurality of reference mode indices based on a plurality of previous mode indices of a plurality of neighboring blocks of the block unit;
determine whether each of the plurality of reference mode indices is greater than a specific one of a plurality of non-angular mode indices;
determine whether a difference between the plurality of reference mode indices is equal to two or greater than two when each of the plurality of reference mode indices is greater than the specific one of the plurality of non-angular mode indices;
select, according to the prediction index, a prediction mode based on a first candidate list when the difference between the plurality of reference mode indices is equal to two;
select, according to the prediction index, the prediction mode based on a second candidate list different from the first candidate list when the difference between the plurality of reference mode indices is greater than two; and
reconstruct the block unit based on the prediction mode, wherein
the first candidate list includes a plurality of first candidate modes having a plurality of first derived indices derived based on at least one of the plurality of reference mode indices, the second candidate list includes a plurality of second candidate modes having a plurality of second derived indices, and at least one of the plurality of second derived indices is different from the plurality of first derived indices.

9. The electronic device according to claim 8, wherein the plurality of first derived indices are five consecutive integers including a plurality of index values of the plurality of reference mode indices, a first derived value derived by adding one to a smaller one of the plurality of reference mode indices, a second derived value derived by subtracting one from the smaller one of the plurality of reference mode indices, and a third derived value derived by adding one to a larger one of the plurality of reference mode indices.

10. The electronic device according to claim 8, wherein the plurality of instructions, when executed by the at least one processor, further causes the at least one processor to:

determine whether a reference line for predicting the block unit is different from a first one of a plurality of neighboring lines, wherein the plurality of neighboring lines neighbor the block unit and the first one of the plurality of neighboring lines is adjacent to the block unit; and select, according to the prediction index, the prediction mode when the reference line is different from the first one of the plurality of neighboring lines.

11. The electronic device according to claim 8, wherein the plurality of instructions, when executed by the at least one processor, further causes the at least one processor to:

determine whether the plurality of reference mode indices are equal to each other when each of the plurality of reference mode indices is greater than the specific one of the plurality of non-angular mode indices;

select, according to the prediction index, the prediction mode based on a third candidate list different from the first candidate list when the difference between the plurality of reference mode indices is less than one; and select, according to the prediction index, the prediction mode based on a fourth candidate list different from the first candidate list when the difference between the plurality of reference mode indices is equal to one, wherein the third candidate list includes a plurality of third candidate modes having a plurality of third derived indices, one of the plurality of third derived indices is derived by adding two to one of the plurality of reference mode indices, the fourth candidate list includes a plurality of fourth candidate modes having a plurality of fourth derived indices, and one of the plurality of fourth derived indices is derived by subtracting two from a smaller one of the plurality of reference mode indices.

12. A method of decoding a bitstream by an electronic device, the method comprising:

receiving an image frame of the bitstream to determine a block unit from the image frame;

determining a plurality of reference mode indices based on a plurality of previous mode indices of a plurality of neighboring blocks of the block unit;

comparing the plurality of reference mode indices to each other;

selecting a prediction list from a plurality of candidate lists based on the comparison, wherein a first one of the plurality of candidate lists is selected when a difference between the plurality of reference mode indices is equal to two, and a second one of the plurality of candidate lists different from the first one of the plurality of candidate lists is selected when the difference is greater than two;

selecting a prediction mode based on the prediction list; and reconstructing the block unit based on the prediction mode.

13. The method according to claim 12, further comprising:

determining a prediction index of the block unit from the bitstream;

determining whether a reference line for predicting the block unit is different from a first one of a plurality of neighboring lines, wherein the first one of the plurality of neighboring lines is adjacent to the block unit and between the block unit and other of the plurality of neighboring lines; and selecting, according to the prediction index, the prediction mode based on the prediction list when the reference line is different from the first one of the plurality of neighboring lines.

14. The method according to claim 12, wherein the first one of the plurality of candidate lists includes a plurality of first candidate modes having a plurality of first derived indices derived based on at least one of the plurality of reference mode indices.

15. The method according to claim 14, wherein the plurality of first derived indices are five consecutive integers including a plurality of index values of the plurality of reference mode indices, a first derived value derived by adding one to a smaller one of the plurality of reference mode indices, a second derived value derived by subtracting one from the smaller one of the plurality of reference mode indices, and a third derived value derived by adding one to a larger one of the plurality of reference mode indices.

16. The method according to claim 14, wherein:

the second one of the plurality of candidate lists includes a plurality of second candidate modes having a plurality of second derived indices; and at least one of the plurality of second derived indices is different from the plurality of first derived indices.

\* \* \* \* \*